(12) United States Patent
Kaidi et al.

(10) Patent No.: US 12,373,833 B2
(45) Date of Patent: Jul. 29, 2025

(54) SELECTION OF ELECTRONIC TRANSACTION PROCESSING CHANNEL AND MULTI-FACTOR USER AUTHENTICATION

(71) Applicant: PAYPAL, INC., San Jose, CA (US)

(72) Inventors: George Chen Kaidi, Singapore (SG); Jiaming Li, Singapore (SG); Ryan Moses Cayamanda, Singapore (SG); Ashwin Ganesh, Chennai (IN); Deepak Buddha, Singapore (SG); Bipin Kesapur, Singapore (SG); Sreeram Vasudevan, Singapore (SG); Li Hua Lim, Singapore (SG)

(73) Assignee: PAYPAL, INC., San Jose, CA (US)

( * ) Notice: Subject to any disclaimer, the term of this patent is extended or adjusted under 35 U.S.C. 154(b) by 148 days.

(21) Appl. No.: 17/954,857

(22) Filed: Sep. 28, 2022

(65) Prior Publication Data
US 2024/0104564 A1   Mar. 28, 2024

(51) Int. Cl.
*G06Q 20/40* (2012.01)
*H04L 9/40* (2022.01)

(52) U.S. Cl.
CPC ....... *G06Q 20/401* (2013.01); *H04L 63/0838* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 10,333,706 | B2 * | 6/2019 | Smith | H04L 63/0492 |
| 10,652,018 | B2 * | 5/2020 | Smith | H04L 63/061 |
| 10,805,085 | B1 * | 10/2020 | Liang | H04L 9/3239 |
| 10,861,112 | B2 * | 12/2020 | Forbes, Jr. | G06Q 30/0283 |
| 10,958,637 | B2 * | 3/2021 | Cage | G06F 16/182 |

(Continued)

FOREIGN PATENT DOCUMENTS

| | | | | |
|---|---|---|---|---|
| JP | 2017182635 A | * | 10/2017 | B60L 53/14 |
| JP | 2019164768 A | * | 9/2019 | B60L 50/60 |

(Continued)

OTHER PUBLICATIONS

Haitao Liu et al. "Application of Blockchain Technology in Electric Vehicle Charging Piles Based on Electricity Internet of Things." (Aug. 31, 2022). Retrieved online Apr. 19, 2024. https://www.hindawi.com/journals/wcmc/2022/8533219/ (Year: 2022).*

(Continued)

*Primary Examiner* — James A Reagan
(74) *Attorney, Agent, or Firm* — Greenberg Traurig, LLP

(57) ABSTRACT

An example method includes receiving a request for a transaction; associating the request with a user; receiving, from the user, identification information; retrieving, from a database, first stored authentication information associated with the user; retrieving, from a distributed ledger, second stored authentication information associated with the user; and determining that the received authentication information matches the first stored authentication details and the second stored authentication details and, in response, outputting, by the computing system, a proof of authentication to enable the transaction.

19 Claims, 9 Drawing Sheets

(56) References Cited

U.S. PATENT DOCUMENTS

| | | | |
|---|---|---|---|
| 11,308,487 B1* | 4/2022 | Foster | G06Q 20/3829 |
| 11,392,927 B2* | 7/2022 | Maus | G06Q 20/30 |
| 11,501,389 B2* | 11/2022 | Forbes, Jr. | G06Q 10/00 |
| 11,601,419 B2* | 3/2023 | Ryu | G06F 3/0488 |
| 11,711,219 B1* | 7/2023 | Liang | H04L 63/0442 |
| | | | 713/182 |
| 11,775,985 B2* | 10/2023 | Abdelsamie | G06Q 30/018 |
| | | | 705/317 |
| 11,927,965 B2* | 3/2024 | Ebrahimi Afrouzi | |
| | | | G06F 3/04845 |
| 2009/0119763 A1* | 5/2009 | Park | H04L 63/0815 |
| | | | 726/8 |
| 2016/0239840 A1* | 8/2016 | Preibisch | G06Q 20/3829 |
| 2017/0358041 A1* | 12/2017 | Forbes, Jr. | G05D 3/12 |
| 2018/0047014 A1* | 2/2018 | Maus | H04L 63/0853 |
| 2018/0351747 A1* | 12/2018 | Spangemacher | H04L 63/126 |
| 2020/0284883 A1* | 9/2020 | Ferreira | G01S 7/4811 |
| 2021/0090185 A1* | 3/2021 | Forbes, Jr. | H02J 13/00034 |
| 2021/0211414 A1* | 7/2021 | Cage | H04L 63/10 |
| 2021/0256536 A1* | 8/2021 | Abdelsamie | G06Q 30/018 |
| 2021/0400032 A1* | 12/2021 | Ryu | G06F 3/0488 |
| 2022/0055770 A1* | 2/2022 | O'Toole | B65G 69/20 |
| 2022/0066456 A1* | 3/2022 | Ebrahimi Afrouzi | |
| | | | G06F 3/04883 |
| 2022/0227251 A1* | 7/2022 | Y. A. | B60L 53/65 |
| 2022/0255969 A1* | 8/2022 | Cage | H04L 9/50 |
| 2022/0272084 A1* | 8/2022 | Hyatt | H04W 12/40 |
| 2022/0351201 A1* | 11/2022 | Maus | G06Q 20/3829 |
| 2022/0351269 A1 | 11/2022 | Maskeri | |
| 2022/0366265 A1 | 11/2022 | Saad | |
| 2022/0366494 A1* | 11/2022 | Cella | H04L 9/50 |
| 2022/0382908 A1 | 12/2022 | Buddhavarapu | |
| 2022/0398538 A1* | 12/2022 | Jakobsson | H04L 9/3213 |
| 2023/0068532 A1* | 3/2023 | Forbes, Jr. | G06Q 30/08 |
| 2024/0064021 A1* | 2/2024 | Yan | H04L 9/50 |
| 2024/0104564 A1* | 3/2024 | Kaidi | G06Q 30/0201 |

FOREIGN PATENT DOCUMENTS

| | | | | |
|---|---|---|---|---|
| JP | 2020042844 A | * | 3/2020 | B60L 53/305 |
| WO | WO-2020182591 A1 | * | 9/2020 | G01S 17/10 |

OTHER PUBLICATIONS

EVGI Working Group. "Blockchains for Electric Vehicles & Grid Integration Review Mobility Open Blockchain Initiative." (Aug. 2020). Retrieved online Apr. 19, 2024. https://dlt.mobi/wp-content/uploads/2020/10/EVGI-Business-Review.pdf (Year: 2020).*

Shiyuan Xu et al. "EVchain: An Anonymous Blockchain-Based System for Charging-Connected Electric Vehicles." (Dec. 2021). Retrieved online Apr. 19, 2024. https://ieeexplore.ieee.org/stamp/stamp.jsp?arnumber=9449329 (Year: 2021).*

James Michael Stewart. "The Three Types of Multi-Factor Authentication(MFA)." (Jun. 26, 2018) Retrieved online Dec. 4, 2024. https://www.globalknowledge.com/us-en/resources/resource-library/articles/the-three-types-of-multi-factor-authentication-mfa/#gref.*

Non-final Office Action from U.S. Appl. No. 17/954,680, dated Mar. 26, 2025, 19 pp.

* cited by examiner
SELECTION OF ELECTRONIC TRANSACTION PROCESSING CHANNEL AND MULTI-FACTOR USER AUTHENTICATION

CROSS-REFERENCE

This application is related to U.S. application Ser. No. 17/954,860, filed Sep. 28, 2022, entitled "SELECTION OF ELECTRONIC TRANSACTION PROCESSING CHANNEL AND MULTI-FACTOR USER AUTHENTICATION."

TECHNICAL FIELD

The instant disclosure relates to managing transactions and facilitating access to a third party system via a central application.

BACKGROUND

The use of mobile devices, such as cellular telephones, to engage in electronic transactions is well known. Such mobile devices can be used for transactions in brick and mortar stores and with online stores. For example, such mobile devices can be used to engage in electronic transactions processed through a number of different channels.

In the course of facilitating electronic transactions and through general use, mobile devices collect or have access to various user authentication information. For example, a user may login to multiple different accounts at a time on their mobile device, such as email accounts, application-specific accounts, device-specific accounts, etc.

DETAILED DESCRIPTION

Generally speaking, mobile devices (e.g., cell phones) provide an incredible amount of utility, in large part due to the prevalence and popularity of applications specifically designed for use on mobile devices. Even without specialized applications, mobile devices provide access, via a network connection, to many other websites or portals that each provide their own functions to a user. While this amount of access can be viewed as a benefit, it could also be a burden on a user who is overwhelmed by options, is unable to navigate fully, or feels unsafe with certain websites or certain information.

As such, it is advantageous to provide a single, central application that may facilitate interactions with each of these applications, and/or may provide additional, complementary, or replacement security while interacting with these applications. For example, this central application could compare item availability across a spread of applications to provide the best option for a user, or could leverage a pool of stored information regarding a user to recommend applications or interactions to the user based on the stored information. Additionally, by serving as a central point-of-access, this application may facilitate a user's access to an otherwise secure third party system that lets the user in based on authentication performed by the central application. Because the authentication is performed by the central application rather than by this third party, the central application may be the only recipient of the user's personal information, and the user may feel more comfortable accessing the secure third party system.

Figure 1:
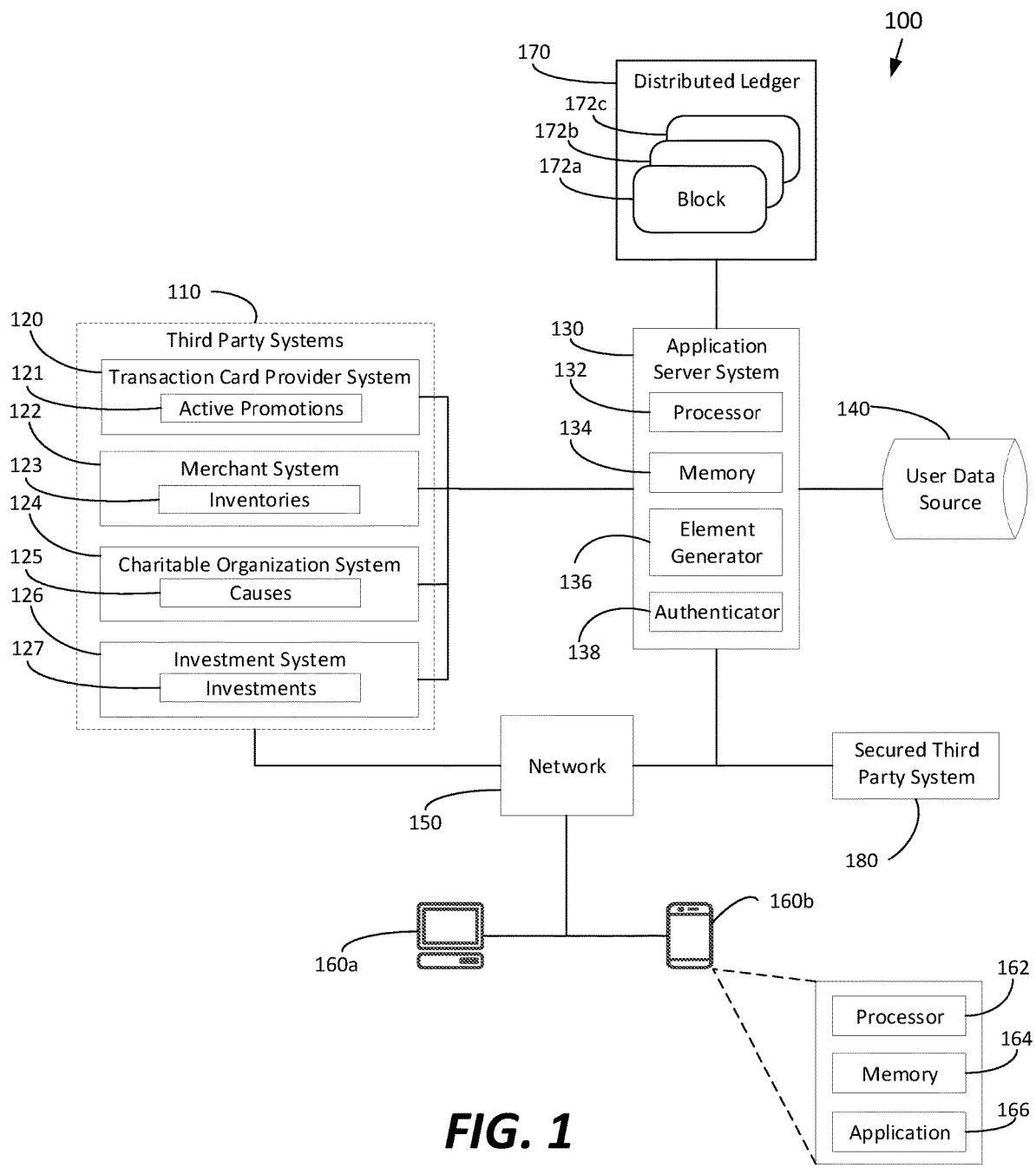
FIG. 1 is a block diagram view of an example system for conducting electronic transactions through one of many processing channels.

Referring to the drawings, wherein like reference numerals refer to the same or similar features in the various views, FIG. 1 is a block diagram view of an example system 100 for selecting electronic transaction processing channels. The system 100 may include third party systems 110, an application server system 130, a user data source 140, user computing devices including a personal computer 160a and a mobile computing device 160b (which may be referred to collectively as the user computing devices 160 or individually as a user computing device 160), a distributed ledger 170, and one or more secured third party systems 180. The third party systems 110, application server system 130, user data source 140, user computing devices, distributed ledger 170, and secured third party system 180 may be in electronic communication with each other through a network 150.

The third party systems 110 may include any systems external to but in network communication with the application server system 130, and maintained by a third party different than a manager of the application server system 130. As shown, the third party systems 110 may include a transaction card provider system 120, a merchant system 122, a charitable organization system 124, and an investment system 126. The third party systems 110 may further include an electric vehicle charging system, which may be in communication with an electric vehicle charging station that may provide electricity or fuel to a vehicle.

The transaction card provider system 120 may facilitate the use of transaction cards (e.g., credit cards, debit cards, etc.) in electronic transactions. As such, the transaction card provider system 120 may, via the network 150, connect to various point-of-sale (POS) devices or online purchasing systems (e.g., the merchant system 122) to enable users to conduct electronic transactions using their transaction cards at these various POS devices or online marketplaces.

The transaction card provider system 120 may include a set of one or more active promotions 121, which may be discounts or other offers connected to particular goods or services. The active promotions 121 may be applied to transactions processed by the transaction card provider system 120, and unencrypted information regarding the active promotions 121 may not be sent or transmitted outside of the transaction card provider system 120. The set of active promotions 121 may be encrypted to prevent an outside party from viewing or otherwise accessing the active promotions 121, and the promotions 121 may be transmitted to the application server system 130 as encrypted files. In some embodiments, the transaction card provider system 120 may select one or more predetermined active promotions to offer to a user, via the application server system 130, based on input from the application server system 130, such as an indication of items selected by a user. Additionally or alternatively, the transaction card provider system 120 may generate promotions dynamically based on the input from the application server system 130. For example, the application server system 130 may provide the transaction card provider system 120 with information regarding one or more items selected by a user, and, in response, the transaction card provider system 120 may add, change, or supplement the active promotions 121 to include a promotion applicable to the selected one or more items.

The merchant system 122 may be respective of a merchant or other provider of goods and services and, in some embodiments, may provide an online interface for users to conduct electronic transactions for goods and/or services. In some embodiments, the merchant system 122 may provide in-store software for operating POS devices and enabling users to purchase goods in-store. The merchant system 122 may include a set of inventories 123 that may include information regarding the goods or services offered. This information may include price, quantity, availability, and other data associated with the goods or services.

The inventories 123 may further include merchant-specific promotions (e.g., separate from the active promotions 121). In some embodiments, the application server system 130 may communicate with the merchant system 122 to suggest merchant-specific promotions based on user activity on an individual or group basis. For example, if the application server system 130 determines that a particular item is popular among users, the application server system 130 may indicate to the merchant system 122 that a promotion on that popular item would increase transaction volume. In another example, if a user adds a particular item to their cart, the application server system 130 may indicate that cart add to the merchant system 122, such that the merchant system 122 could offer a promotion on that item to entice the user.

The merchant system 122 may set or adjust item characteristics in the inventories 123 to take advantage of predicted user habits. For example, the merchant system 122 may receive data from the application server system 130 indicating that community interest in tortilla chips and similar snacks rises on weekend mornings in autumn, and the merchant system 122 may adjust characteristics of such snacks in response, such as by presenting those snacks differently to users in an electronic interface.

Items covered by active promotions 121 may be identified by one or more datapoints associated with the item (e.g., item name, brand name, item type, merchant category code, SKU, serial number, quantity, version number, etc.) Similarly, items in the inventories 123 may be identified by the same datapoints, which facilitates matching items across the active promotions 121 and inventories 123. Information regarding the active promotions 121 may be stored by the transaction card provider system 120, and may be used by the transaction card provider system 120 to match active promotions 121 to item information in the inventories 123, or may be associated with the active promotions 121 when transmitted to the application server system 130 and utilized by the application server system 130. Active promotions 121 information may be generated when the active promotions 121 are themselves generated in the transaction card provider system 120, and may be added to, edited, or otherwise adjusted by the transaction card provider system 120 or, as discussed herein, by the application server system 130 based on user activity. Similarly, information regarding items in the inventories 123 may be stored in the merchant system 122, and may be used directly by the merchant system 122 to match inventories 123 with active promotions 121, or may be associated with the inventories 123 prior to transmitting inventories 123 information to the application server system 130. Inventories 123 information may be generated when item entries are generated in the inventories 123, or may be derived from item listing (e.g., on an e-commerce site).

The charitable organization system 124 may be respective of a charitable organization that may provide relief or other charitable services to populations in need. The charitable organization system 124 may include a set of causes 125 that are prioritized or otherwise focused on by the charitable organization. The set of causes 125 may include information about the causes themselves (e.g., population being helped, areas of concern), as well as information about the charitable organization's contributions (e.g., amount of funds, amount of services, recency of support, etc.).

The investment system 126 may be respective of an investment provider that may manage or otherwise hold funds from users or may offer investments in which users may invest. The investment system 126 may be respective of, for example, an investment manager, an investable fund proprietor, a brokerage, etc. The investment system 126 may include a set of investments 127. These investments 127 may include information about each investment 127, including risk, minimum threshold, target, fields supported, etc.

The application server system 130 may include a processor 132 and a non-transitory, computer-readable memory 134 storing instructions that, when executed by the processor 132, cause the application server system 130 to perform one or more of the steps, processes, methods, operations, etc. described herein with respect to the application server system 130. The application server system 130 may provide a graphical user interface (GUI) for the user devices 160 that may enable the user to interact with one or more functions of an application 166. The application 166 here may be a user's access point to one or more of the third party systems 110 via the network 150.

Each user device 160 may include a processor 162 and a non-transitory, computer-readable memory 164 storing instructions that, when executed by the processor 162, cause the user device 160 to perform one or more of the steps, processes, methods, operations, etc. described herein with respect to the user device 160. The user device 160 may further include the application 166 (e.g., stored in the memory 164 for execution by the processor 162) supported by the application server system 130. As discussed above, the application 166 may include a GUI that enables the user to interact with one or more of the third party systems 110. The application server system 130 may support the application 166 by generating the application 166 for display in a browser or similar program and/or by generating and transmitting data that is used by a user computing device (e.g., user device 160) to populate the interface of the application 166.

The application server system 130 may further include an element generator 136 that may provide an interactive element for direct interaction with one or more of the third party systems 110. The interactive element may be provided to a user via the application 166 of the user device 160, and may be a virtual button, image, or text with which a user can interact (e.g., touch a portion of a screen of the user device 160 containing the interactive element) to initiate an action with respect to one or more of the third party systems 110. For example, the element generator 136 may provide an interactive element that enables a user to use a transaction card from the transaction card provider system 120 to conduct an electronic transaction with the merchant system 122. In another example, the element generator 136 may provide an interactive element that enables a user to direct resources (e.g., from a transaction card of the transaction card provider system 120) to a cause 125 from the charitable organization system 124 and/or to an investment 127 from the investment manager system 126.

The application server system 130 may interact with one or more of the third party systems 110 to provide the interactive element. For example, the application server system 130 may receive a selection of one or more items via a user device 160, and may compare this selection to the inventories 123 of the merchant system 122 to determine one or more merchants with the selected items in stock. The selection of one or more items may be received via a user's (virtual) shopping cart, a user's watchlist, a user's wishlist, or any other list or grouping generated by the user. For example, the user may define a group of users based on a personal relationship (e.g., family, friends, co-workers), and the list utilized by the merchant system 122 may be a list co-generated by that group of users. These users may be derived from the original user's contacts, which may be stored on the user device 160, such that the user may form the group by selecting one or more contacts via a GUI provided by the application 166. In one example, a user may be going on a trip. The user may then create a group in the application 166 that includes the other users going on the trip, and all users may then generate a list of items needed for the trip. The merchant system 122 may then access this co-generated list.

From there, the application server system 130 may compare the selection (e.g., the co-generated list for the users' trip) to the active promotions 121 of transaction card provider system 120 to determine an amount of overlap with the active promotions (e.g., items in the selection to which there are active promotions 121 that apply). In response to the determination of the overlap, the element generator 136 may provide an interactive element that enables the purchase of the selected items from a merchant with appropriate stock using a transaction card with a promotional overlap. In this way, the application server system 130 may create a dynamic promotion for the user by matching, in real-time, the user with a particular merchant and a particular transaction card.

In addition to matching a user with a merchant or transaction card based on selected items, the application server system 130 may recommend additional items based on the third party systems 110. These additional items may be one or more goods or services from the particular merchant above, such that the additional items are in-stock and may be the subject of active promotions from the particular transaction card. For example, if an active promotion requires the selection of two separate items, and the first item is included in the user's original selection, the application server system 130 may recommend (via the element generator 136) the second item to the user, provided the second item is in the inventory 123 of the optimal merchant.

The application server system 130 may further include an authenticator 138 that may facilitate the verification of a user's identity based on information stored on a database (e.g., user data source 140), based on information stored on a distributed ledger (e.g., distributed ledger 170), and/or based on information obtained from one or more third-party services or applications (i.e., other than the application 166) on or through user computing device 160. As such, the authenticator 138 may request and/or retrieve information from the user data source 140, from the distributed ledger 170, and/or from one or more third-party services or applications and compare the retrieved information to information received directly from a user (e.g., via the user computing device 160). In response to this comparison, the authenticator 138 may determine whether or not to authenticate the user and, if the authenticator 138 determines to authenticate the user, generate a token indicative of a positive authentication. The generated token may be a visual code (e.g., QR code) or may be a backend indication of the authentication. In some embodiments, the generated token may be communicated to a secured third party system 180 as proof of identity, which may cause the secured third party system 180 to initiate an action (e.g., complete a transaction, begin charging an electric vehicle, permit access to premises, etc.).

The secured third party system may be any secured system to which a user may wish to gain access. The secured third party system can be, for example, the secured third party system can be a building security system, a computing terminal access control, a point of sale system or similar system, such as an electric vehicle charger or gas pump, and the like. In some embodiments, a secured third party system 180 may be the same as one of the third party systems 110 (e.g., to permit a user to log in to an account with a transaction card provider system 120).

The user data source 140 may include information about a plurality of users of the application server system 130, including demographic details of the user, a history of user interactions with the application, a financial profile of the user, etc. As shown in FIG. 1, the user data source 140 is in communication with the application server system 130, such that the application server system 130 may receive information from the user data source 140 and may send (e.g., update) information in the user data source 140. For example, the application server system 130 may retrieve information from the user data source 140 to establish a risk profile of the user for a possible investments, and may then update the information in the user data source 140 to include the determined risk profile for later use.

The user data source 140 may further include information for a user derived from one or more Internet of Things (IoT) devices. This information may include a status or other information respective of one or more devices of the user (e.g., a smart home hub, a vehicle, etc.). For example, the information may include an inventory of a smart fridge, such that the user data source 140 may provide or otherwise supplement a grocery list for the user. In another example, driving habits of a user may be stored in the user data source 140 to inform the application server system 130, for example. These IoT-based data may be collected by the user computing device 160, which may be in direct network communication with the one or more IoT devices, and transmitted to the application server system 130 via the application 166.

The user data source 140 may also include information regarding user spending habits and IoT-based data, which may be received from the user device 160 and, particularly, the memory 164 of the user device 160. Information regarding user spending habits may also be received by the user data source 140 from the application server system 130, which may track user spending habits based on user interactions with one or more of the third party systems 110 that may be facilitated by the application server system 130. The application server system 130 may leverage information in the user data source 140 to recommend items based on user habit and need. For example, the application server system 130 may recommend toilet paper if the user typically purchases toilet paper this week of the month, and may recommend milk if the current milk in the user's smart fridge expires in a day. As such, the application server system 130 leverages real-time IoT information to recommend items beyond a user selection. Furthermore, the characteristics (e.g., price) of the items in the inventories 123 may be affected and adjusted in response to action by the application server system 130. For example, the application server system 130 may derive community-wide spending habits based on spending habits of users in the community, and may send an indication of those habits to the merchant system 122, and the merchant system 122 may adjust one or more prices in response. In another example, the application server system 130 may identify an imminent celebration or event (e.g., determine that a user's birthday is next week based on calendar data) and may send an indication of this imminent event for the merchant system 122 to adjust characteristics for items related to the particular event (e.g., lower a price on party hats).

Additionally, the information from the user data source 140 may include information regarding users other than the user involved in a particular transaction, which the application server system 130 may use to generate recommendations. For example, the user data source 140 may include information regarding each user that has interacted with the application server system 130, such as each user who has loaded and used the application 166 on their own user device 160. These recommendations based on other user activity may be generated using content filtering and/or collaborative filtering. Content filtering may include determining another user similar to the user based on a comparison of user information, such that the similar user has similar spending habits, item selections, demographic information, etc. This similarity may be determined using Pearson's Correlation, for example, which transforms elements in the user profiles to vector-form and then determines a distance between respective user vectors. An example formula for calculating a similarity s of two vectors is shown in equation (1) below:

$$s_{u,v} = \frac{\sum (r_{ui} - \bar{r}_u)(r_{vi} - \bar{r}_v)}{\sqrt{\sum (r_{ui} - \bar{r}_u)^2} \sqrt{\sum (r_{vi} - \bar{r}_v)^2}} \quad \text{(Eq. 1)}$$

where u is the user at-issue, v is another user, and r is a value assigned to a set of items. For example, r may be a rating left by a user in a review of an item, or r may be a quantity of items on a wish list of the user. Users above a certain similarity value may be grouped or clustered with other users, and an indication of this grouping may be stored in the user data source 140.

Collaborative filtering may be used to generate recommended items based on the similar user. An example generation formula is shown as equation (2) below:

$$P_{u,i} = \frac{\sum_v r_{v,i} * s_{u,v}}{\sum_v s_{u,v}} \quad \text{(Eq. 2)}$$

where $P_{u,i}$ is a predicted item, r is a value assigned to the set of items by the user, and s is the similarity between users (e.g., the output of the similarity formula above). As such, collaborative filtering may be used to identify items that are strongly associated with a similar user but that are not present in the user at-issue's cart or wishlist.

A quantity of items that the application server system 130 recommends and the frequency with which items the application server system 130 pushes these recommendations may be based on a feedback loop that focuses on previous users' interactions with previously-presented recommendations. For example, if previous users interacted with (e.g., clicked on or added to cart) recommended items infrequently, the feedback loop may cause items to be recommended to future users less frequently. Information regarding previous users' interactions may be stored in the user data source 140.

The application server system 130 may also connect users with one or more causes 125 and investments 127, such as by recommending causes 125 and/or investments 127 to users. Determining a particular cause (e.g., a cause 125 that aligns with a user) or a particular investment (e.g., an investment 127 that aligns with a user) may be based on information from the user data source 140. The particular cause may be determined based on a charitable profile established by the user, such that the user data source 140 includes a set of beliefs or interests that were input from a user. Alternatively the charitable profile may be derived from other data regarding the user, such as demographics, spending habits, financial activity, etc. For example, if the user has a history of transactions at pet stores, the user's charitable profile may include an inclination towards animal-based causes. As such, the particular cause may be determined based on a comparison of elements in a user profile to elements defined for the causes 125.

Similarly, the particular investment may be determined using an investment profile of a user that may be generated by a user and/or derived from (or supplemented by) information in the user data source 140. The investment profile may include a risk profile, which establishes an amount of risk with which the user is comfortable, an investment level, which indicates how much money a user is willing or able to invest, as well as any other limitations (e.g., no investments in fossil fuel, a desire to support small businesses, etc.). Once the investment profile is established, the particular investment may be determined by comparing the investment profile to the investments 127. In contrast to the determination of particular cause in which the comparison is looking for an amount of overlap, the determination of a particular investment may involve threshold determinations. As such, rather than determining a cause that is closest to a user's profile, the application server system 130 may make a binary determination of whether a particular investment 127 matches a user's profile. For example, if an investment has a higher risk than a user's risk profile, that investment may not be determined as an investment to recommend to the user. The particular investment, therefore, may be one or more investments 127 that satisfy the criteria established by the user's investment profile.

In some embodiments, the particular investment may be a quantity of cryptocurrency that is minted as part of the user's transaction. Rather than purchasing some amount of cryptocurrency already in circulation, the interactive element from the element generator 136 may enable the user to mint cryptocurrency or cause cryptocurrency to be minted, which may be managed or otherwise provided by a same party that manages the application server system 130. Minting cryptocurrency may include, for example, generating new units of a cryptocurrency by authenticating a user's data, generating one or more data blocks indicative of that user (or indicative of other data), and adding these blocks (e.g., via a "proof of stake" algorithm) to a blockchain associated with the particular cryptocurrency. Because the same party managing the application server system 130 is managing this blockchain, offering an opportunity to mint as part of a transaction facilitated by the application server system 130 may be an effective way of introducing new coins into circulation.

In some embodiments, the application server system 130 provides an interactive element to contribute to a cause 125 or invest in an investment 127 without a separate underlying transaction. In other embodiments, the interactive element may be provided in conjunction with an underlying transaction, such that an amount of the contribution or investing may be based on the underlying transaction (e.g., the amount of savings provided by the active promotions 121). For example, the application server system 130 may determine that a user may save $10 based on promotions matched with user-selected items. The element generator 136 may subsequently generate an interactive element that enables the user to direct the saved $10 to either a particular (from the causes 125) and/or the particular investment (from the investments 127). In this way, the application server system 130 may link information and functionality of each of the third party systems 110 together to provide a more comprehensive and cohesive user experience.

In some embodiments, the data managed by one or more of the third party systems 110 may be encrypted or otherwise secured by the third party systems 110. In these embodiments, therefore, the application server system 130 may perform comparisons involving data from the third party systems 110 using private set intersection (PSI). PSI is a cryptographic technique that allows for the comparison of two encrypted datasets without decryption. As a result of PSI, only those elements in the intersection of the two datasets are revealed to the parties. For example, if PSI is performed between the active promotions 121 and the selected items, only those items to which active promotions 121 apply are revealed—not the entire set of active promotions 121.

The distributed ledger 170 may include blocks 172a, 172b, and 172c (collectively "blocks 172") and may be formed by a distributed network of devices (e.g., user computing devices 160) that agree on a single history of interactions in the order in which they were received such that it may be determined that any device may access a block on the distributed ledger 170 and be assured of its position and veracity. Each device in the distributed network may operate to collect new interactions (e.g., datapoints) into a block, and then to increment a proof-of work system that includes determining a value that when hashed with the block provides a required number of zero bits, in some embodiments.

For example, for block 172c that may include information on a user or user account (or many users or user accounts), a device in the distributed network may increment a nonce in the block 172c until a value is found that gives a hash value of the block 172c the required number of zero bits. The device may then "chain" the block 172c to the previous block 172b (which may have been "chained" to the previous block 172a in the same manner). When devices in the distributed network find the proof-of-work for a block, that block (e.g., block 172c) is broadcast to the distributed ledger 170, and other devices in the distributed ledger 170 will accept that block. The distributed network will always consider the longest chain of blocks to be the correct one, and will operate to continue to extend it. If a device receives two different versions of a block, it will work on the first block received, but save the second block received in case the branch of the chain that includes the second block becomes longer (at which point that device will switch to working on the branch of the chain that includes the second block).

In one example, the system 100 enables a user to access an application (e.g., application 166) on their phone (e.g., user device 160) and interact with various third parties (e.g., third party systems 130), such as to conduct a transaction, support a charitable cause, re-fuel a vehicle, etc. The phone application is supported by an application server system (e.g., application server system 130), which utilizes stored user data (e.g., from the user data source 140) to guide the user and provide recommendations for the user's interactions with the third parties. The user may access data of one or more of the third party systems via the application, and the application server system (or application itself) may determine or recommendation an interaction with a third party system based on the user data (e.g., item selection, user history, user location, etc.) and may provide the option for that interaction to the user through the application in response to the user access of the third party system data. For example, the application may determine a sale for a particular item is available at a local merchant (relative to the user's location), and may offer the user the ability to purchase the particular item at that sale price via the application.

In addition to or separate from facilitating user interactions with the third party systems, the application (by way of the application server system) may also control or regulate user access to one or more of the third party systems. The application may receive credentials from the user, either as a log-in attempt for the application itself or as a log-in attempt for a particular third party system, and may compare the received credentials to information stored in one or more locations. For example, the application may compare the received credentials to information stored in a database (e.g., user data source 140) in connection with the application server system 130, in a memory (e.g., memory 134) of the application server system 130 itself, or in a distributed ledger (e.g., distributed ledger 170) separate from but in network communication with the application server system. Based on this comparison(s), the application may grant or facilitate user access to one or more third party systems, which may, in some embodiments, lead to an interaction with the third party systems that may be further facilitated or guided by the application.

In some embodiments, the methods and operations described herein as being performed by the application server system 130 may be performed exclusively by the application server system 130 and subsequently displayed on the application 166, such that any backend processing may occur on the application server system 130 rather than on the user device 160. In other embodiments, the methods and operations described herein as being performed by the application server system 130 may be performed exclusively the application 166 loaded on the user device 160, such that any backend processing may occur on the user device 160. In these embodiments, the application 166 may be a copy of or may include all of the relevant coding from the application server system 130, such that the application 166 may perform all of the capabilities described herein regarding the application server system 130. In yet other embodiments, the methods and operations described herein as being performed by the application server system 130 may be performed by a combination of the application server system 130 and the application 166, such that some operations (e.g., receiving user login credentials) may be performed by the application 166 and other operations (e.g., retrieving stored information from the distributed ledger 170) may be performed by the application server system 130. Similarly, the methods and operations described herein as being performed by the application 166 may be performed exclusively by the application 166, exclusively by the application server system 130, or by a combination of the application 166 and the application server system 130.

Figure 2:
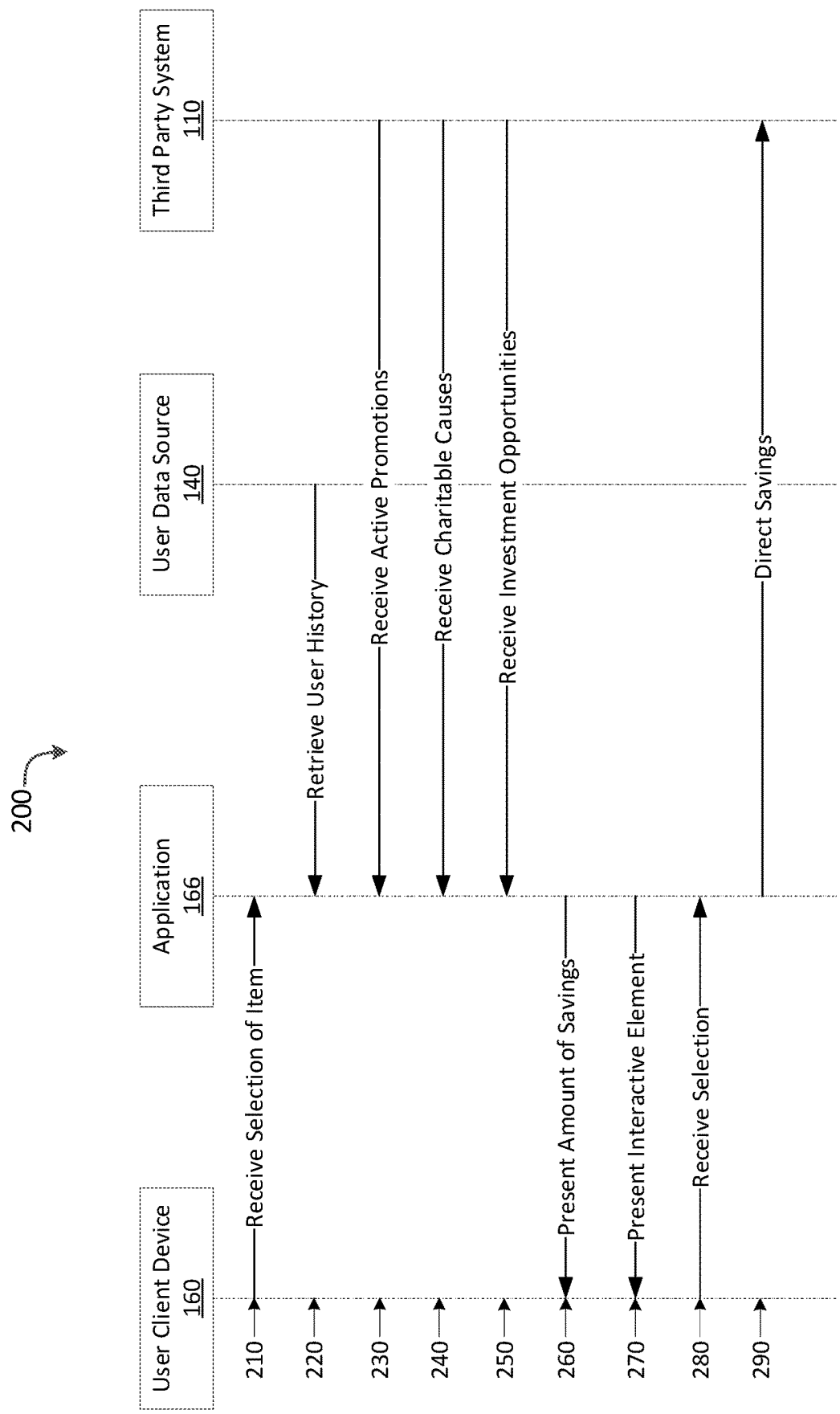
FIG. 2 is a sequence diagram illustrating an example process of facilitating an electronic transaction via a central application.

FIG. 2 is a sequence diagram illustrating an example process 200 of facilitating an electronic transaction. The process 200 may involve a user client device 160, an application 166, a user data source 140, and a plurality of third party systems 110. The application 166 may be managed by the application server system 130 of FIG. 1, and may provide a GUI on the user client device 160.

The process 200 may include, at operation 210, the user client device 160 transmitting, and the application 166 receiving, data indicative of a user selection of an item. Operation 210 may include the user client device receiving the user selection from the user via an interface of the application 166. For example, the selection of the item may be a user tapping or otherwise interacting with an indication of an item on the application.

The process 200 may also include, at operation 220, the application 166 retrieving a user history from the user data source 140. The user history may be particular to the user associated with the user client device 160, in some embodiments. Additionally or alternatively, the retrieved user history may include multiple user histories, such as data respective of multiple other users. The other users may be randomly selected, or may include users that may be determined to be similar (e.g., via content filtering) to the user associated with the user client device 160.

The process 200 may further include, at operation 230, receiving a set of active promotions from the third party system 110, at operation 240, receiving a set of charitable causes from the third party system 110, and, at operation 250, receiving a set of investment opportunities from the third party system 110. In some embodiments, each of operations 230, 240, 250 may be performed by the same third party system 110 while in other embodiments, each of steps 230-250 may be performed by different systems within the third party system 110 or different managers that manage the third party system 110. For example, as discussed above with regard to the third party systems 110, the third party system 110 may include a system managed by a transaction card provider (e.g., transaction card provider system 120), a system managed by an investment provider (e.g., investment manager system 126), and a system managed by a charitable organization (e.g., charitable organization system 124).

In some embodiments, the set of received information at any of steps 230, 240, 250 may be based on the selection received at operation 210. In these embodiments, the application 166 may (prior to receiving the information) request information from the third party system 110 based on the selection, such that the received information is based on that request. The request from the application may include information regarding the selection itself, as well as information about the user who made the selection. For example, the application 166 may request active promotions associated with the selected item by including information about the selected item, such that the active promotions received at 230 may be only those active promotions that apply to the item(s) selected on the user client device 160. In another example, the application 166 may request investment opportunities that correspond to a risk profile of the user by sending a request that includes information (e.g., the risk profile) about the user. The set of received information may also be received separately from the selection at operation 210, such that the application 166 may receive information regarding promotions, charitable causes, and investment opportunities prior to receiving a selection from a user in order to be pre-equipped to respond to a selection.

In other embodiments, the set of received information at any of operations 230, 240, 250 may be agnostic to the selection received at operation 210. In these embodiments, the application 166 may receive most or substantially all of the information provided by the third party system 110. For example, the application 166 may receive all active promotions at operation 230, in contrast to receiving only those promotions applicable to the selected item(s). As such, the application 166 may process the information received at operations 230, 240, 250 to determine those pieces of information (e.g., active promotions, charitable causes, investments) that are relevant to the user. For example, the application 166 may compare the set of received active promotions to the item(s) selected to determine those active promotions that apply to the received selection. This comparison may be a private set intersection to maintain the confidentiality and encryption of the received information.

The process 200 may also include, at operation 260, the application 166 presenting an amount of savings on the user client device 160. The amount of savings may be based on the active promotions, and may include an amount of money that would be removed from the price of the selected item(s) by applying active promotion(s) to the item(s). The presented amount of savings may include an indication of the transaction card associated with the savings, such that the amount of savings is presented with the transaction card that would generate the amount of savings. In some embodiments, multiple transaction cards are presented, such that the user client device 160 displays multiple amounts of savings.

The process 200 may further include, at operation 270, presenting an interactive element based on the information received from the third party system 110. As described above with regard to the element generator 136, the interactive element may be a virtual button or other graphical element with which the user may interact by selecting on a screen or tapping (for a touch-sensitive display) a portion of the display containing the interactive element. The interactive element may be presented alongside the amount of savings from operation 260, such that the interactive element may be an option to complete a transaction using the transaction card associated with the amount of savings. The interactive element may also be associated with one or both of the charitable causes and investment opportunities received at 240 and 250 respectively, such that the interactive element may be an option to direct some amount of funds (e.g., the amount of savings) to a charitable cause and/or investment opportunity. The cause and/or opportunity presented as the interactive element may be determined by the application 166 as most relevant based on an analysis of the user history received at 220.

The process 200 may also include, at operation 280, the application 166 receiving a selection from the user client device 160 and, at operation 290, directing an amount of savings to the third party system 110. For example, the selection at 280 may be of an interactive element to conduct a transaction using a particular transaction card and using the resultant savings to invest in a particular investment opportunity. The selection may be indicated or made by the user by tapping (for a touch-sensitive display) or moving a cursor over the interactive element, and the selection may be received directly by the user device (e.g., the device on which the actual selecting action, like tapping, may be received) and indirectly by the application server system 130 that may receive, via the network 150, an indication of the selection. In this example, the third party system 110 may process the transaction using the particular transaction card and invest the user's funds in the particular investment opportunity. In effect, the user is spending the same amount of money as they would for a transaction without any sales (e.g., full list price), but is instead receiving the same items but with a bonus investment.

Figure 3:
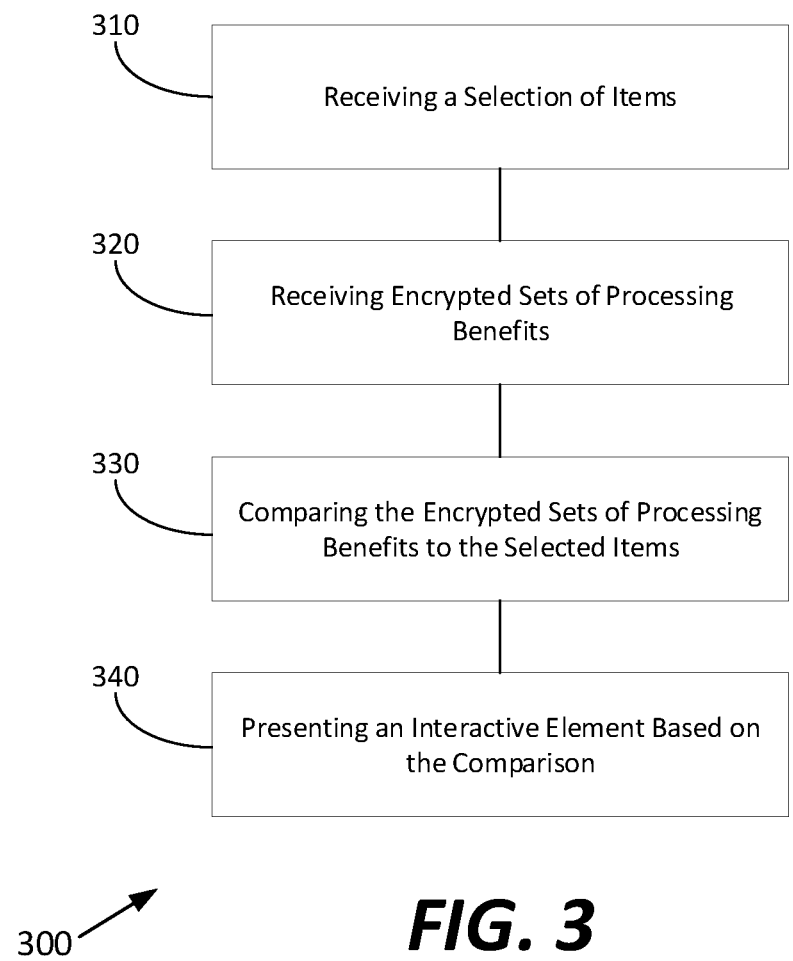
FIG. 3 is a flow chart illustrating an example method of facilitating an electronic transaction according to processing benefits of various processing channels.

FIG. 3 is a flow chart illustrating an example method 300 of determining an amount of processing benefits for an interaction. The method 300, or one or more portions of the method 300, may be performed by the application server system 130 [or by the app], in some embodiments.

The method 300 may include, at block 310, receiving a selection of one or more items from a user device. The user device may be the user computing device 160, and the selection of items may be input by a user on a GUI supported by the application server system 130 on the user device.

The method 300 may also include, at block 320, receiving respective encrypted sets of processing benefits from one or more third party systems. Each processing benefits set may be associated with a respective processor or processing system, such that the processing benefits set includes an amount of processing savings associated with executing an electronic transaction using the associated processor. For example, the processing benefits may be an amount of time that the processor may take to process the electronic transaction, or may be a cost for the processor to process the electronic transaction. In another example, the processing benefits may be active promotions associated with transactions involving particular items or categories of items, and the processors may be transaction cards, transaction card providers, or transaction card processors.

The method 300 may also include, at block 330, comparing the encrypted sets of processing benefits to the selected items. In some embodiments, the encrypted sets of processing benefits may be decrypted in order to compare them, while in other embodiments, the encrypted sets of processing benefits may be compared to the selected items in such a way as to preserve the encryption (e.g., private set intersection). The comparison may be based on an overlap of information regarding the processing benefits and the selected items. For example, the sets of processing benefits may include indications of what types of data the processing benefits apply to, and the comparison may involve determining which or how many of the selected items are of that particular type of data. As a result of the comparison, an amount of processing benefits associated with each processor may be determined for this particular selection of items. Because each item in the selection may have a different data type and because each processor may have a different set of processing benefits, this comparison is dynamic and unique to each selection.

The method 300 may further include, at block 340, presenting an interactive element based on the comparison. The interactive element may be presented on the user device on which the items are initially selected, and may be presented on the same GUI through which the selections are initially made. The interactive element may be an option to process the selected items according to a processor associated with the compared processing benefits. In some embodiments, a single interactive element may be presented based on the processor with the highest processing benefits.

In other embodiments, multiple interactive elements may be presented, with each interactive element tied to a processor with processing benefits. The interactive element, in either embodiment, may include an indication of an amount of processing benefits. These processing benefits may include an amount of time that a particular processor would take to process an amount of data, or may include a relative cost of utilizing a particular processor.

Figure 4:
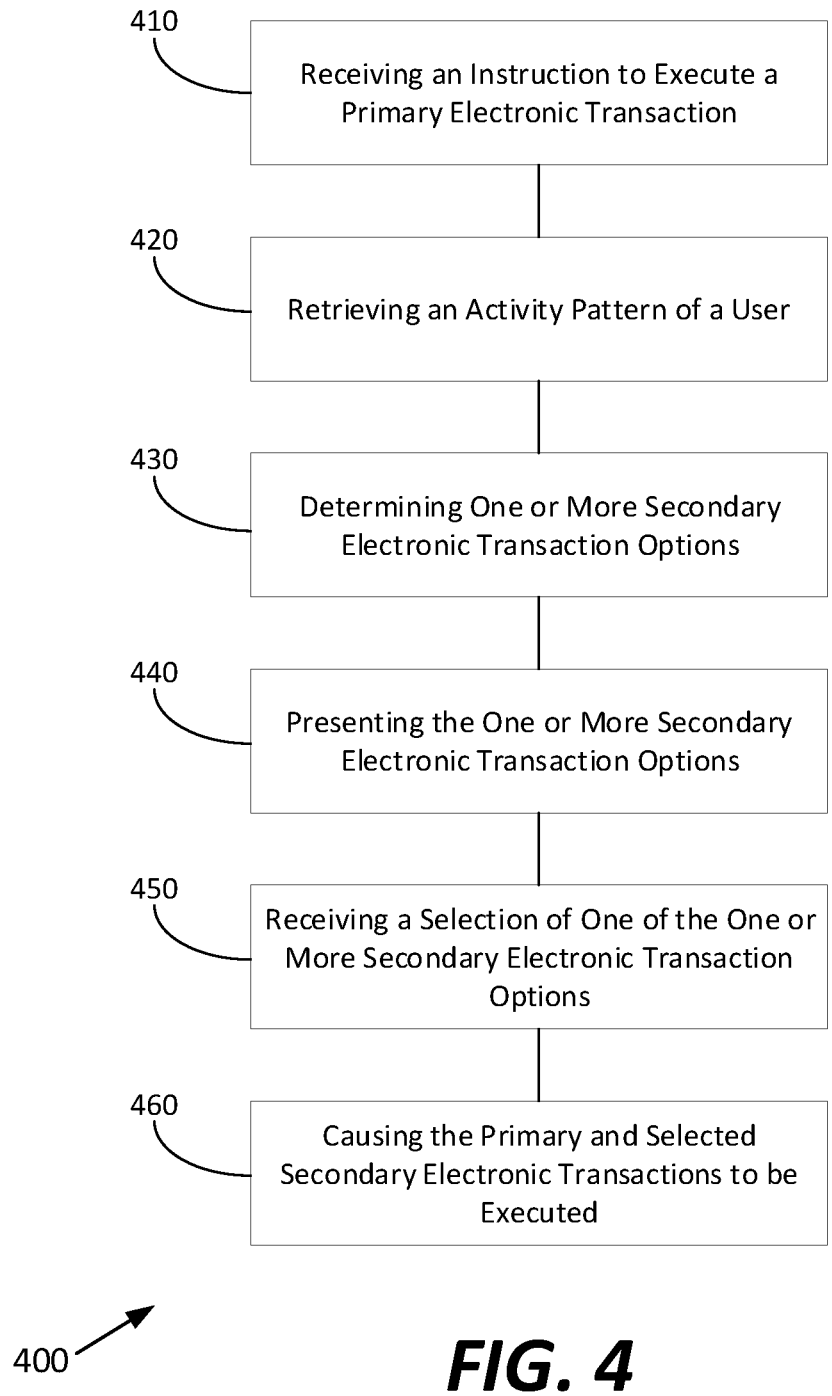
FIG. 4 is a flow chart illustrating an example method of executing multiple electronic transactions.

FIG. 4 is a flow chart illustrating an example method 400 of executing multiple transactions. The method 400, or one or more portions of the method 400, may be performed by the application server system 130 [or by the app], in some embodiments.

The method 400 may include, at block 410, receiving an instruction to execute a primary electronic transaction. The instruction may be received from a user device (e.g., user computing device 160), and the primary electronic transaction may involve a request for information respective of, purchase, or other transaction respective of one or more items.

The method 400 may also include, at block 420, retrieving an activity pattern of a user. The user may be the same user associated with the user device from which the instruction is received at 410, which may be based on information or other metadata included with the instruction. For example, the instruction may include a name or account number of a user, which may be used to associate the user with stored data. In another example, the user device may be associated with a MAC number that may also be associated with stored information for a user, such that the instruction received at 410 may include this MAC number. The activity pattern may be a set of interactions and selections made by the user on the website associated with the primary electronic transaction. In some embodiments, the activity pattern may further include a set of interactions made by the user on other sites or applications. Because the application may enable or facilitate user access to these other sites or applications, the activity pattern may include data from these other sites even if the primary electronic transaction may be unrelated to these other sites. The activity pattern may be stored on a database (e.g., user data source 140) separate from but in network communication with the application server system 130, such that the activity pattern is retrieved from this database.

The method 400 may also include, at block 430, determining one or more secondary electronic transaction options based on the user activity pattern. The one or more secondary electronic transaction options may be received from one or more third party systems that offer goods, services, or other items separate or distinct from the subject of the primary transaction. For example, the secondary transaction options may be investment opportunities from an investment manager or charitable causes from a charity. Determining a secondary transaction option based on the user activity pattern may include analyzing the user activity pattern to derive a user profile. The user profile may include user preferences, risk-averseness, and other characteristics of the user. Block 430 may further include comparing the user profile to the available secondary transaction options to determine a match or sufficiently similar secondary transaction option. The comparison may be based on determining an amount of overlap between the user profile and characteristics of each available secondary transaction option. For example, each investment opportunity may have a risk-level and a timeline, and a comparison to the user profile may include determining whether the risk-level and timeline match the risk-averseness and age of the user profile. If a single secondary transaction option does not match, the closest secondary transaction option (e.g., the most similar) may be selected at block 430, or the closest secondary transaction options (e.g., all options within a threshold similarity) may be selected. In some embodiments in which no secondary transaction option is determined as a match, the block 430 may not select a secondary transaction option, and the method 400 may end.

The method 400 may also include, at block 440, presenting the one or more secondary electronic transaction options and, at block 450, receiving a selection of one or the one or more secondary electronic transaction options. The presentation may include an interactive element presented on the user device from which the selection is received at 410, and the selection may be received based on interaction with that interactive element. The presentation may be made based on the determination from block 430, such that the interactive element presented may be associated with a secondary transaction option determined to be related to the user. In this way, a single interactive element associated with the most relevant secondary option may be presented, or multiple interactive elements associated with the most relevant secondary options may be presented. The amount of interactive elements presented may be based on the similarity determination at block 430. For example, if a single secondary transaction option is determined as a match, a single interactive element corresponding to the matched secondary transaction option may be presented. In another example, if four secondary transaction options are within a threshold similarity, four interactive elements corresponding to the four secondary transaction options may be presented.

The method 400 may further include, at block 460, causing the primary and selected secondary election transactions to be executed. This may include sending all necessary information to a third party transaction processing system (e.g., transaction card processor) to deduct funds based on a selected transaction card or from a particular account and direct the funds to relevant parties. For example, a transaction card selected as part of the primary transaction may be processed, with an amount of funds for the primary transaction to be sent to the primary transaction party (e.g., a merchant) and an amount of funds for the secondary transaction to be sent to the secondary transaction party (e.g., investment manager, charity, etc.)

Figure 5:
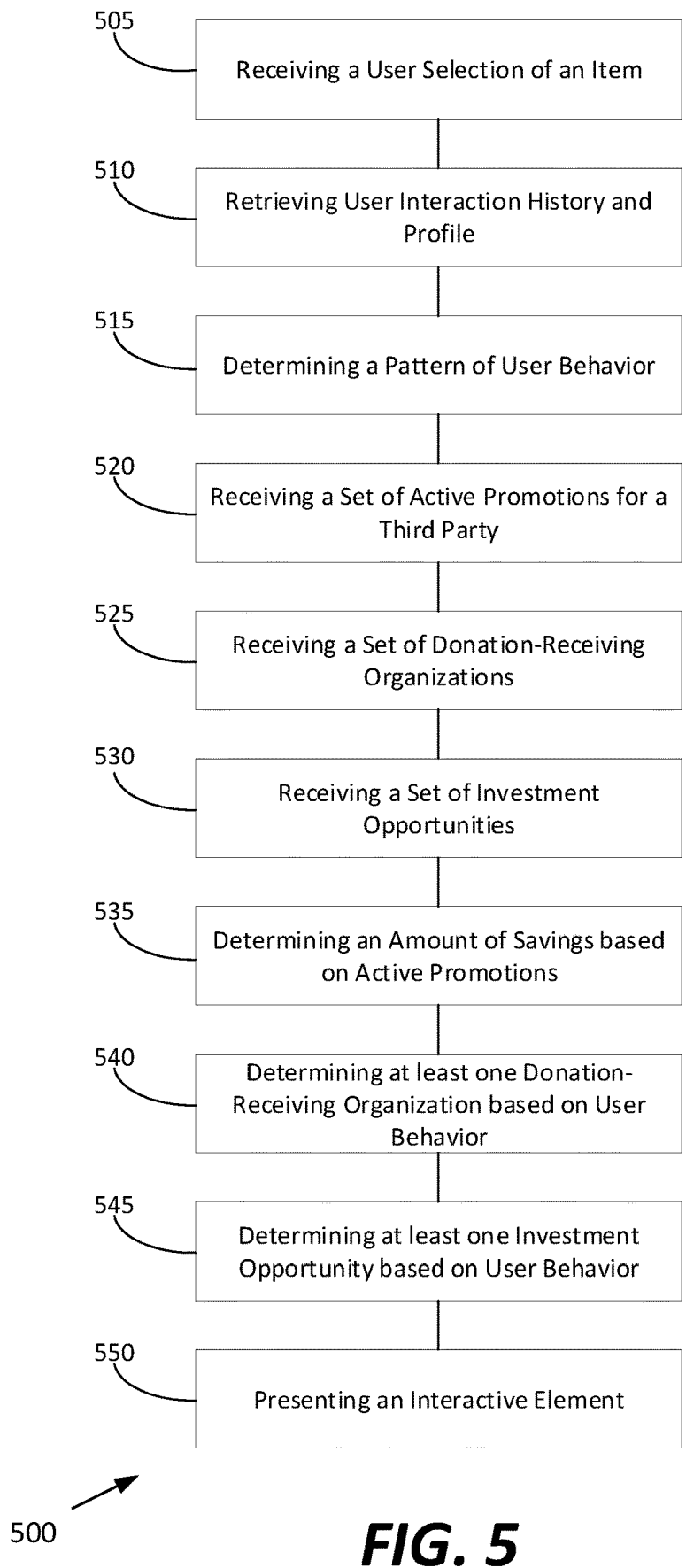
FIG. 5 is a flow chart illustrating an example method of determining and presenting secondary electronic transactions for a user according to a primary electronic transaction.

FIG. 5 is a flow chart illustrating an example method 500 of determining and presenting secondary transactions for a user to supplement a primary transaction. The method 500, or one or more portions of the method 500, may be performed by the application server system 130, in some embodiments.

The method 500 may include, at block 505, receiving a user selection of an item. The selection may be made on and received from a user device (e.g., user computing device 160). In some embodiments, a GUI may be provided (e.g., by the application server system 130) on the user device that may be part of an e-commerce website, and the user selection of an item may be to purchase a product on the e-commerce website.

The method 500 may also include, at block 510, retrieving a user interaction history and profile, and, at block 515, determining a pattern of user behavior based on the retrieved information. The user interaction history and profile may be stored in a database (e.g., user data source 140) separate from and in network communication with the application server system 130. The interaction history may be a set of interactions and other actions taken by the user on the GUI provided by the application server system 130, as well as any other relevant interactions (e.g., search history, application downloads, etc.) on the user device. The profile may be derived from user activity (e.g., browsing history, download history, sequence of inputs on an application, etc.), or may be set by a user (e.g., the user enters information upon joining the application provided by the application server system 130). The pattern of user behavior may be derived from the specific actions in the history and profile, such that the pattern may be a sequence of actions (or types of actions) or item selections (or types of items). The types of actions may include selecting items for viewing, purchasing items, navigating away from items, or other similar interactions with items presented on the user device. The types of items may include a category to which the item belongs, so that the pattern of user behavior may utilize categories of items rather than the specific items themselves. By utilizing the larger categories, the application server system may avoid recommending an item to the user that is in the same category as the user's initial selection, despite being a different item (e.g., recommending a different brand of cereal).

The method 500 may also include, at block 520, receiving a set of action promotions for a third party, at block 525, receiving a set of donation-receiving organizations, and, at block 530, receiving a set of investment opportunities. In some embodiments, these sets of information may be received from the same third party system, while in other embodiments, each set of information may be received from different systems. For example, as discussed above with regard to the third party systems 110, the sets of information may be received from a system managed by a transaction card provider (e.g., transaction card provider system 120), a system managed by an investment provider (e.g., investment manager system 126), and a system managed by a charitable organization (e.g., charitable organization system 124).

The method 500 may further include, at block 535, determining an amount of savings based on the set of active promotions. The amount of savings may be for the selection of item(s) at block 505, and may be determined based on an application of active promotions to the set of selected items. In those embodiments in which multiple sets of active promotions are received (e.g., with each set corresponding to a transaction card), each set may be separately applied to the set of selected items, such that an amount of savings may be separately determined for each set of active promotions. Determining which active promotion to apply to which selected item may be based on one or more characteristics of the item (e.g., merchant code, brand name, product type, etc.)

The method 500 may also include, at block 540, determining at least one donation-receiving organization, and, at block 545, determining at least one investment opportunity based on the pattern of user behavior. Determining a donation-receiving organization and investment opportunity based on the user activity pattern may include an analysis of the user activity pattern to derive user preferences, risk-averseness, and other characteristics of the user. From there, the derived information may be compared to the available charitable organization and investment options to determine a match or close-fit. The comparison may be based on determining an amount of overlap between the user pattern and characteristics of each available option. For example, each investment opportunity may have a risk-level and a timeline, and a comparison to the user profile may include determining whether the risk-level and timeline match the risk-averseness and age of the user profile.

The method 500 may further include, at block 550, presenting an interactive element based on the determined amount of savings and determined donation-receiving organization and/or investment opportunity. The interactive element may present an option to complete a transaction involving the selected items using a transaction card associated with the determined amount of savings, and to direct an amount of additional funds (e.g., the amount of savings) towards the determined donation-receiving organization and/or investment opportunity. The interactive element may be presented on a GUI of the user device, and may be presented on the same e-commerce website through which the item selection is initially made.

Methods and systems according to the present disclosure may have numerous applications. For example, a user may be able to compare savings or other rewards offered by different cards in real-time and without having to manually re-enter information each time. Similarly, a user may be able to compare deals across different stores to determine the best overall price for their desired goods, rather than doing a piece-meal comparison or having to add their entire cart at different websites before manually comparing the bottom-line. By providing savings and deals across different cards and different stores in real-time, the methods and systems described herein leverage internet-centric tools to provide solutions to internet-centric issues. Furthermore, overall strain on application servers are reduced, as users no longer are entering card information for each transaction, nor are users repeatedly adding and re-adding items to a cart to determine pricing for various cards, which improves server performance due to this reduction in load.

Figure 6:
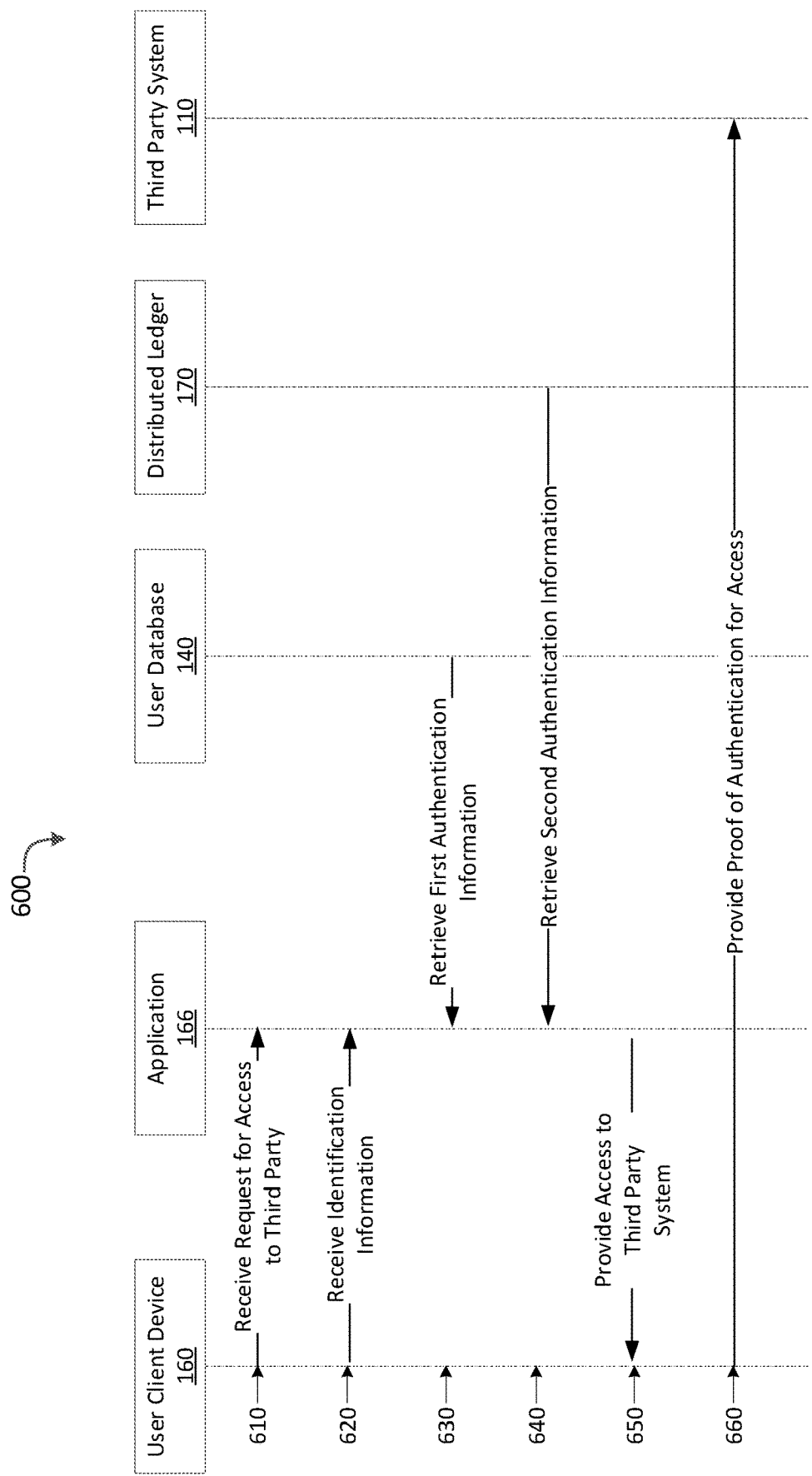
FIG. 6 is a sequence diagram illustrating an example process of authenticating a user and granting access to a third party system via a central application.

FIG. 6 is a sequence diagram illustrating an example process 600 of authenticating a user and granting access to the user to a third party system. The process 600 may involve a user client device 160, an application 166, a user data source 140, a distributed ledger 170, and a third party system 110. The user client device 160 may be user computing device 160 of FIG. 6, such that the user client device 160 is configured to receive one or more inputs from a user. The application 166 may be supported by the application server system 130 of FIG. 6, and may include a GUI on the user client device 160. The application server system 130 may support the application 166 by generating the application 166 for display in a browser or similar program and/or by generating and transmitting data that is used by a user computing device (e.g., user device 160) to populate the interface. The user data source 140 may store information regarding one or more users. The distributed ledger 170 may include blocks that contain information regarding one or more uses. The third party system 110 may be managed by a party separate from the party managing the application 166.

Process 600 may include, at operation 610, the application 166 receiving a request for access to the third party system 110 via the user client device 160. The request may be made by a user through interaction with the application 166 loaded and displayed on the user client device 160. In this way, the application 166 may be a secure gateway for the third party system 110 to allow access to the third party system 110 in support of, in conjunction with, or instead of security measures maintained by the third party system 110. The request for access may be made using a GUI on the user client device 160 provided or generated by the application 166. The request may accompany a transaction or initiation of a transaction that involves the third party managing the third party system 110. For example, the request for access may be part of a request by the user to charge their electric vehicle at an electric vehicle charging station associated with (e.g., owned by, managed by, operated by, etc.) the third party system 110.

Process 600 may also include, at operation 620, the application 166 receiving identification information from the user client device 160. The identification information may be encrypted according to a public/private key pair of the user prior to the user providing the information or as part of the reception process (e.g., the application 166 facilitates the encryption once provided). The identification information may include one or more datapoints associated with a user, such as an account identifier, a password, a username, a user's name, block hash, etc. The identification information may also include biometrics from the user, or sensor information gathered by the user client device (e.g., location of the user). The user may input the identification information on the user client device 160, and particularly on a GUI generated and provided by the application 166. For example, the user may enter the identification information as part of a login screen for the application 166.

Process 600 may also include, at operation 630, the application 166 retrieving first authentication information from the user data source 140. The first authentication information may include one or more datapoints that were entered by the user on a previous interaction with the application 166 and subsequently stored in the user data source 140. For example, the first authentication information may include a user profile that is established when the user signed up for an account with the application 166. The application 166 may retrieve the first authentication information in response to the received identification information, such that the particular first authentication information is retrieved based on the identifying information (e.g., the first authentication information is associated with the same user that entered the identification information). For example, the application 166 may look at the username included in the identification information and may retrieve the first authentication information that contains the same username. In another example, the application 166 may retrieve the first authentication information that includes the biometrics received from the user. In some embodiments, the first authentication information may be received from a remote or unrelated party that provides authentication or login services. For example, the first authentication information may be an indication of a successful login to an operating system on the user device 160 or to a web-based account separate and distinct from the application 166.

Process 600 may also include, at operation 640, retrieving second authentication information from the distributed ledger 170. The second authentication information may include one or more datapoints that were entered by the user on a previous interaction with the application 166 and subsequently used to generate a block on the distributed ledger. For example, the second authentication information may include a user profile that is established when the user signed up for an account with the application 166. In some embodiments, when the user signs up for an account with the application 166, the application 166 may post the user profile to the distributed ledger 170, which is then corroborated by other user devices running the application 166, as described above. The application 166 may retrieve the second authentication information in response to the received identification information, such that the particular block accessed by the application is based on the identifying information (e.g., the block with the second authentication information is associated with the same user that entered the identification information). For example, the application 166 may look at a hash value included in the identification information and may access the block associated with the hash. In another example, the first authentication information may include the hash value, and the application 166 may first retrieve that hash value from the first authentication information, as described in operation 630. In this example, the application 166 may use the identification information to retrieve a hash value, and then may use the hash value to retrieve the block on the distributed ledger 170 that contains the second authentication information. In some embodiments, the authentication information stored on the distributed ledger may be encrypted, and the user client device may store a private key that can decrypt the authentication information, in which case the private key serves as to authenticate the user.

The process 600 may further include, at block 650, the application 166 providing the user client device 160 with access to the third party system 110. The application 166 may authenticate the user in response to a comparison of the identification information to at least one of the first authentication information or the second authentication information. The comparison may be an attempted matching of one or more datapoints of the identification information to corresponding datapoints in the authentication information. For example, the application 166 may attempt to match a password in the identification information with a password in the first authentication information, and to match a user birthday in the identification information with a user birthday in the second authentication. If the match is successful (e.g., the datapoints are identical), the application 166 may authenticate the user and generate a proof of authentication, which may be an access token generated by the application (e.g., by the authenticator 138).

The process 600 may further include, at block 660, the user client device 160 providing proof of authentication respective of the user for access to the third party system 110. This proof of authentication may be the access token generated at block 650, and may be provided to the third party system 110 via a display on the user client device 160 (e.g., a QR code on the user client device 160 is scanned by an optical sensor connected to the third party system 110) or via a network connection (e.g., an access code is transmitted from the user client device 160 [or the server] to the third party system 110). In response to being provided the proof of access, the third party system 110 may enable a transaction that accompanied the request for access at 610. For example, if the third party system 110 is an electric vehicle charging station system, the third party system 110 may enable charging in response to receiving the proof of authentication. In other examples, the proof of authentication may provide access to a building, allow a user to log into a computer, withdraw funds from an ATM, unlock a bike or scooter lock, dispense a meal from a vending machine, sign in to a video game server, etc. The proof of authentication may be a one-time use code, such that the process 600 may be repeated for each occasion that the user requests access.

Figure 7:
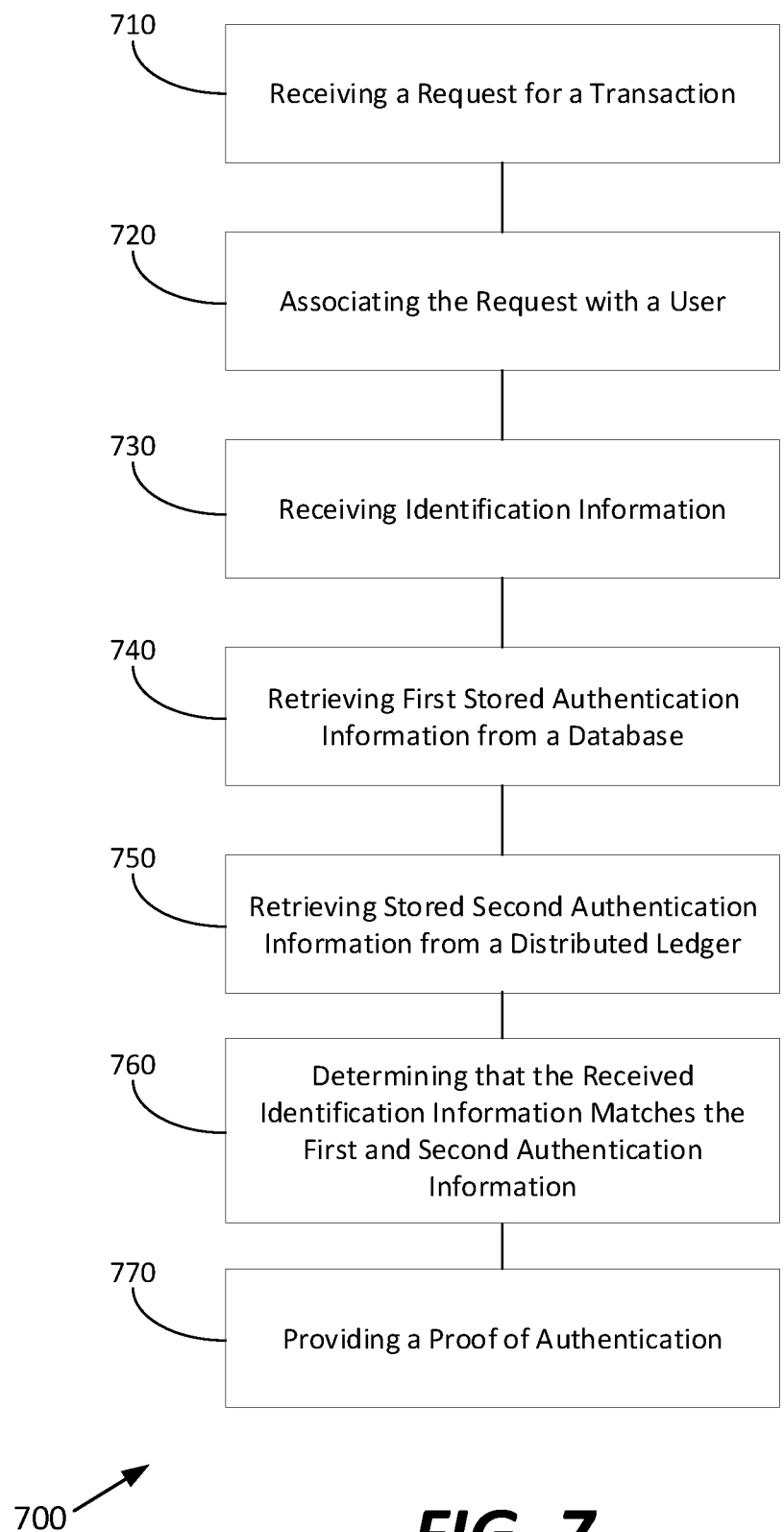
FIG. 7 is a flow chart illustrating an example method of providing access to a third party system.

FIG. 7 is a flow chart illustrating an example method 700 of providing access to a third party system. The method 700, or one or more portions of the method 700, may be performed by the application server system 130, in some embodiments.

The method 700 may include, at block 710, receiving a request for a transaction. The request may be received from a user device (e.g., user computing device 160), and may be made on a GUI of an application generated and provided by the application server system 130. The transaction may be between a user associated with the user device and a third party (e.g., separate from the application server system 130), such that the application server system 130 may be an intermediary between the user and the third party. In some embodiments, the request may be generated by the user client device in response to the device being within a threshold distance of the third party. For example, if the transaction request is for charging an electric vehicle, the request (and subsequent request for access) may be automatically generated once the user's device (e.g., in the user's vehicle) parks next to the charging station.

In these embodiments, a user may first input, via the user device, a general request to utilize an electric vehicle charging station. In response, the application may determine one or more available charging stations (e.g., third party systems) based on a location of the user, capacity of the stations, compatibility with the user's vehicle, etc. Once the available stations are determined, the application may present the available stations as options to the user via the user device. This presentation may include one or more characteristics (e.g., a location of each charging station, a time of travel to each charging station, a location type, a price per unit of each charging station about each available charging station, etc.), and may accompany an option (e.g., via interactive element) for a user to select one of the available stations. This available station may be the third party system of method 700.

The method 700 may also include, at block 720, associating the request with a user, and, at block 730, receiving identification information from the user from the user device. Associating the request with a user may include determining one or more datapoints (e.g., IP address, device serial number, etc.) of the user device from which the request was received, and associating those one or more datapoints with user details. The received identification information, as described above with reference to operation 620 of FIG. 6, may be encrypted according to a public/private key pair of the user, and may include one or more datapoints associated with a user, such as an account identifier, a password, a username, a user's name, block hash, an answer to a verification question, etc. If the identification information is encrypted, the user device may retrieve a private key to decrypt the identification information prior to analysis. The user may input the identification information on the user device, and particularly on a GUI generated and provided by the application server system 130 on the user device. For example, the user may enter the identification information as part of a login screen for the application operated by the application server system 130.

The method 700 may also include, at block 740, retrieving first stored authentication information from a database (e.g., user data source 140) separate from and in network communication with the application server system 130. As discussed above with reference to operation 630 of FIG. 6, the first stored authentication information may include one or more datapoints that were entered by the user on a previous interaction with the application and subsequently stored in the database. For example, the first authentication information may include a user profile that is established when the user signed up for an account with the application. The first authentication information may be retrieved in response to the received identification information, such that the particular first authentication information is retrieved based on the association at block 720. In some embodiments, the first authentication information may be received from a remote or unrelated party that provides authentication or login services. For example, the first authentication information may be an indication of a successful login to an operating system on the user device 160 or to a web-based account separate and distinct from the application 166.

The method 700 may also include, at block 750, retrieving stored second authentication information from a distributed ledger. The distributed ledger may be distributed ledger 170 of FIG. 6, and the second stored authentication information, as discussed above with reference to operation 640 of FIG. 6, may include one or more datapoints that were entered by the user on a previous interaction with the application and subsequently used to generate a block on the distributed ledger. For example, the second authentication information may include a user profile that is established when the user signed up for an account with the application. In some embodiments, the second stored authentication information may be retrieved from a block on the distributed ledger identified by a hash either received as part of the identification information or associated with the user at block 750.

The method 700 may further include, at block 760, determining that the received identification information matches the first and second authentication information. This may include the attempted matching of one or more datapoints of the identification information to corresponding datapoints in the authentication information. For example, the application may attempt to match a password in the identification information with a password in the first authentication information, and to match a user birthday in the identification information with a user birthday in the second authentication.

In some embodiments, third authentication information is received from a distributed ledger (e.g., distributed ledger 170) in network communication with the application. The third authentication information may, similar to the second authentication information, be used to log in to a trusted system, and confirmation of a third valid login may be required, in these embodiments.

The method 700 may further include, at block 770, providing a proof of authentication in response to the matching at block 760. If the match from block 760 is successful (e.g., the datapoints are identical), the application may generate the proof of authentication, which the user may present to grant the user device access to the third party system. This grant of access may include or may be enabled by the proof of authentication generated by the application (e.g., by the authenticator 138). For example, the proof of authentication may be a visual code (e.g., QR code) generated on a GUI of the user device, and subsequently scanned by the third party system. In another example, the proof of authentication may be backend code that may be transmitted from to the third party system over a network (e.g., without visual component). In some embodiments, a transaction between the user and the third party is automatically initiated or executed in response to receiving the proof of authentication.

Figure 8:
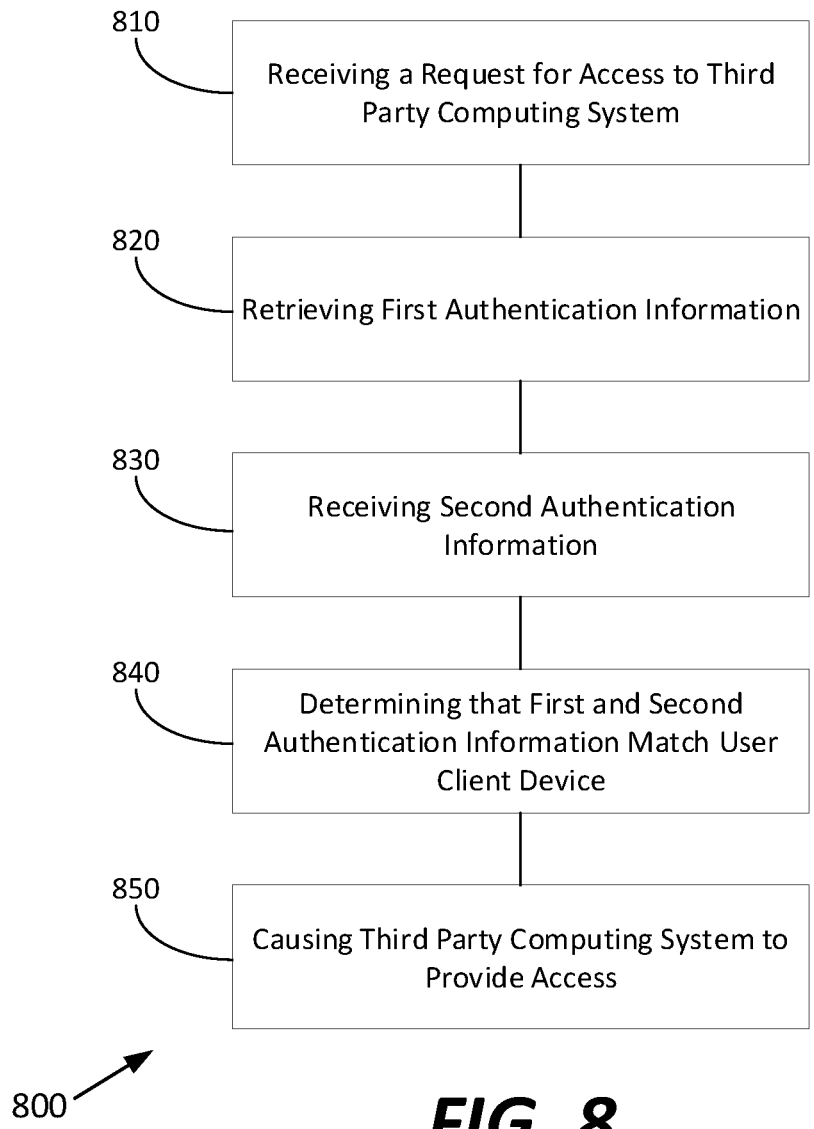
FIG. 8 is a flow chart illustrating an example method of providing access to a third party system.

FIG. 8 is a flow chart illustrating an example method 800 of providing access to a third party system. The method 800, or one or more portions of the method 800, may be performed by the application server system 130, in some embodiments.

The method 800 may include, at block 810, receiving a request from a user device (e.g., user computing device 160) for access to a third party computing system (e.g., third party system 110). The request may be received as part of a transaction between a user associated with the user device and a third party associated with the third party computing system, such that the application may act as an intermediary between the transacting parties. By acting as an intermediary, the application may provide a secure channel for the transacting parties to enable the transaction to occur while minimizing risk for both parties. For example, because the application may securely store the user's financial information for processing payment, the third party may never directly receive the user's financial information (e.g., credit card number), which reduces a risk of theft. And because the application may independently authenticate the user, the third party may be provided with a wider base of users without needing to separately authenticate each and every user.

The method 800 may also include, at block 820, retrieving first authentication information, and, at block 830, retrieving second authentication information. The steps and actions taken at blocks 820 and 830 are similar to those of blocks 740 and 750 of FIG. 7.

The method 800 may also include, at block 840, determining that the first and second authentication information both match the user device from which the request may be received at block 810. Matching the user device may refer to matching information derived from the user device. For example, the application may derive one or more datapoints from the user device, such a name of the user associated with the user device, an IP address of the user device, a serial number of the user device, etc. The application may also utilize an IoT device in communication with the user device to derive datapoints, such as by using triangulation between the IoT device and the user device. The derived information may then be compared to the first and second authentication information to determine a match. For example, the first authentication information may include a name of a user associated with the account, and the match is successful if that stored name is the same as the name derived from the user device. In another example, the first authentication information may include a location (e.g., based on a location of an IoT device that the user's device is attempting to access), and the application may utilize cell tower triangulation of a phone to determine the location of the user, and the match may be successful if the determined location is the same as the stored location associated with the IoT device.

The method 800 may further include, at block 850, causing the third party system to provide access. As discussed with reference to block 810, the initial request for access may accompany a transaction, so the third party system providing access may enable or process that transaction. For example, if the initial request for access is part of a request to utilize an electric vehicle charging station, the provision of access may be an initiation of charging the user's vehicle. The provision of access may include a proof of authentication generated and subsequently presented to the third party system.

Figure 9:
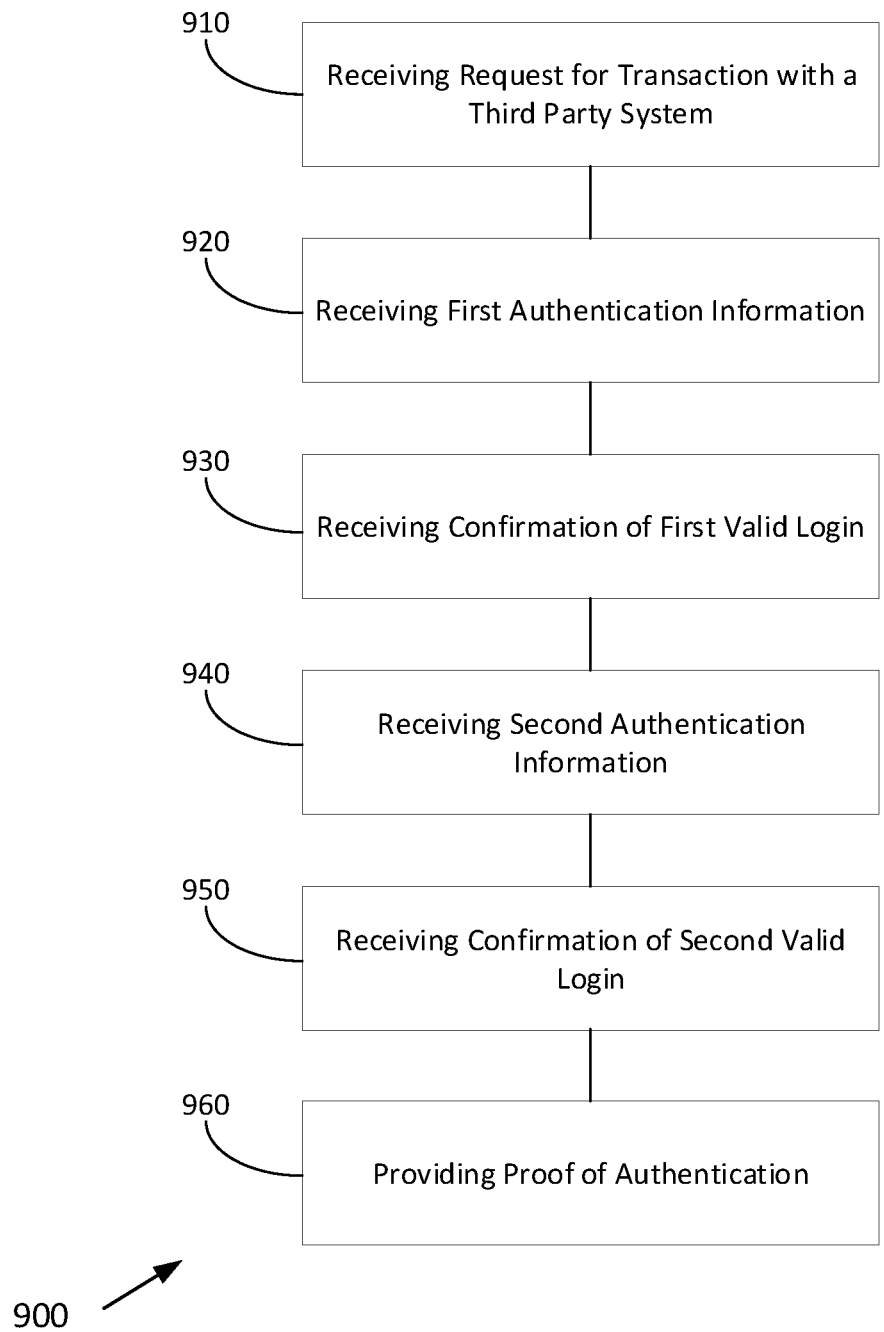
FIG. 9 is a flow chart illustrating an example method of providing access to a third party system.

FIG. 9 is a flow chart illustrating an example method 900 of providing access to a third party system via an application. The method 900, or one or more portions of the method 900, may be performed by the application server system 130, in some embodiments.

The method 900 may include, at block 910, receiving a request from a user device for a transaction with a third party system. The transaction request may be made via a GUI on the user device that is provided or generated by an application provided by the application server system 130. The transaction may involve a service provided by the third party system, and the request may include a request for access to the third party.

The method 900 may also include, at block 920, receiving first authentication information from the user device, and, at block 930, receiving confirmation of a first valid login from a first trusted system. The first authentication information may be used to login to the first trusted system, such that the confirmation of the first valid login is in response to the first authentication information prompting a first valid login. The first trusted system may be local (e.g., on the user device) system, and the first authentication information may include biometric information (e.g., a fingerprint) or an answer to a something-you-should-know test. In some embodiments, the first trusted system may be a remote or unrelated party that provides authentication or login services. For example, the first authentication information may be an indication of a successful login to an operating system on the user device 160 or to a web-based account separate and distinct from the application 166.

The method 900 may further include, at block 940, receiving second authentication information from the user device, and, at block 950, receiving confirmation of a second valid login from a second trusted system. The second authentication information may be used to login to the second trusted system, such that the confirmation of the second valid login is in response to the second authentication information prompting a second valid login. The second trusted system may be a system in network communication with the user device, such that the second trusted system may be separate from the user device. The application may facilitate the connection, such that the application passes the second authentication information to the second trusted system. For example, the second trusted system may be a financial institution system linked to the application, and the second authentication information is a username and password associated with the user's account with the financial institution.

The method 900 may also include, at block 960, providing proof of authentication in response to receiving confirmations of both the first and second valid logins. As discussed above with reference to block 770 of FIG. 7, the proof of authentication may generated by the application (e.g., by the authenticator 138) and may provide or be part of access to the third party system. For example, the proof of authentication may be a visual code (e.g., QR code, .gif file, picture, or other visual representation) generated on a GUI of the user device, and subsequently scanned by the third party system. In another example, the proof of authentication may be backend code that may be transmitted from to the third party system over a network (e.g., without visual component). In some embodiments, a transaction between the user and the third party is automatically initiated or executed in response to receiving the proof of authentication.

Methods and systems according to the present disclosure may have numerous applications. For example, by leveraging two separate sources of authentication information for approving access, the methods described herein provide an additional layer of security. Having one of those sources be a distributed ledger further secures the process, and builds on the inherent security and immutability of a distributed ledger. In those embodiments in which the third party system is providing a service to the user, authentication by an intermediary streamlines the process for both transactors, as the intermediary (e.g., the application described herein) consolidates the necessary security measures onto a single party, such that neither transactor has to supply their own security or risk-reduction measures. This consolidation provides a technical solution to an internet-centric problem, as all internet-based transactions are exposed to additional risks that may be alleviated by the methods herein.

In some embodiments, a non-transitory computer readable medium storing program instructions that, when executed by a processor, may cause a computer system to perform operations comprising receiving, from a user, a selection of one or more items; receiving, from one or more processors, one or more encrypted sets of processing benefits, each encrypted set associated with a respective processing channel and each processing benefit associated with an item; comparing, by private set intersection, the respective items of the sets of processing benefits to the selected one or more items; and presenting, on a user interface, an interactive element based on the comparison.

In some of these embodiments, the computer system further matches each of the selected one or more items to one or fewer of the processing benefits; retrieves a processing cost of each of the selected one or more items; and determines a processing savings based on the matching and on the processing cost of each of the selected one or more items; wherein the presenting is further based on the processing savings.

In some of these embodiments, the interactive element enables the user to select the processing channel associated with the set of processing benefits having a largest amount of processing savings relative to the determined amount of processing savings of the other encrypted sets. In other of these embodiments, the computer system further retrieves an electronic activity history of the user; determines, based on the electronic activity history and the selected one or more items, a behavior pattern of the user; compares the user behavior pattern to the encrypted sets of processing benefits; and determines, based on the comparison, a recommended set of items comprising items that are associated with at least one processing benefit and that are not included in the one or more selected items, wherein the interactive element enables the user to select at least one of the recommended set of items.

In some of these embodiments, determining the recommended set of items is further based on an electronic activity history of a second user via collaborative filtering, the collaborative filtering identifying items unique to the second user activity history. In other of these embodiments, a size of the recommended set of items and a frequency with which the interactive element is presented are determined using a feedback loop based on interactions from at least one previous user.

In some embodiments, a method for processing an electronic transaction includes receiving, by a computing system from a user computing device, an instruction to execute a primary electronic transaction; retrieving, by the computing system, an activity pattern of a user; determining, by the computing system, according to the user activity pattern, one or more secondary electronic transaction options, each secondary electronic transaction option including an electronic transaction between the user and a respective third party; presenting, by the computing system to the user, the one or more secondary electronic transaction options; receiving, from the user, by the computing system, a selection of one of the one or more secondary electronic transaction options; and causing, by the computing system, the primary electronic transaction and the selected secondary electronic transaction to be executed in response to the user instruction to execute the primary electronic transaction and the user selection of the selected secondary electronic transaction option.

In some of these embodiments, each third party comprises a transaction processing entity or one or more transacting entities, and each secondary electronic transaction option comprises one or more sets of processing benefits associated with one of the transaction processing entities or one of the transacting entities. In some of these embodiments, the user activity pattern comprises a set of items predicted to be selected by the user, and wherein determining the one or more secondary electronic transaction options further comprises determining an amount of overlap that comprises one or more of the set of items that correspond with at least one of the set of processing benefits. In some of these embodiments, each third party is associated with one or more inventories; and the amount of overlap further comprises one or more of the set of predicted items that correspond with at least one of the set of processing benefits and that are contained within at least one of the inventories. In some of these embodiments, causing the secondary electronic transaction option to execute comprises retrieving the set of predicted items with the at least one set of processing benefits associated with the selected secondary electronic transaction option. In some of these embodiments, presenting the one or more secondary electronic transaction options comprises presenting an interactive element on the user computing device.

In some of these embodiments, the determined pattern is encrypted by the computing system; the one or more sets of processing benefits are encrypted; and the comparison comprises a private set intersection that compares the determined pattern to the one or more sets of processing benefits without decryption.

In some of these embodiments, the one or more secondary electronic transaction options comprise one or more sets of services provided by the third party, and each set of the one or more sets of services corresponds to one of the third parties. In some of these embodiments, the user activity pattern comprises a set of interests of the user, determining the one or more secondary electronic transaction options further comprises determining an amount of overlap that comprises a quantity of the set of interests that correspond to the provided services, and is determined for each of the one or more third parties, and presenting the one or more secondary electronic transactions options comprises presenting a secondary electronic transaction option corresponding to the set of services with a highest amount of overlap.

In some of these embodiments, the one or more secondary electronic transaction options comprise a set of investment opportunities, the determined pattern comprises a set of interests of the user, and determining the one or more secondary electronic transaction options further comprises determining an amount of overlap that comprises one or more of the investment opportunities that correspond to the set of interests. In some of these embodiments, receiving data indicative of a user profile; and determining a risk profile based on the user profile data, wherein the amount of overlap further comprises one or more of the secondary electronic transaction options based on the determined risk profile.

In some embodiments, a non-transitory computer readable medium containing program instructions causes a computer to perform operations including receiving, from a user, a selection of an item; retrieving a user interaction history and a user profile; determining a pattern of user behavior based on the user interaction history and on the user profile; receiving, from a third party, a set of active promotions for the third party, each of the active promotions corresponding to an item; receiving a set of donation-receiving organizations, each of the donation-receiving organizations corresponding to a set of supported causes; receiving, from an investment provider, a set of investments, each of the investments corresponding to a risk profile; determining an amount of savings based on a comparison of the selected item to the set of active promotions; determining at least one donation-receiving organization based on a comparison of the supported causes to the pattern of user behavior; determining at least one investment based on a comparison of the risk profiles to the pattern of user behavior; and presenting, on a GUI, an interactive element that enables a user to complete a transaction involving the selected item and direct the amount of savings to the at least one determined donation-receiving organization or to the at least one determined investment.

In some of these embodiments, the set of active promotions is encrypted by the third party, and wherein the comparison of the selected item to the set of active promotions is done via private set intersection. In some of these embodiments, the operations further include retrieving one or more other interaction histories from one or more other users; identifying the other interaction history that most closely matches that of the user interaction history based on a comparison of the one or more other interaction histories to the user interaction history; and determining one or more items from the identified other interaction history that are related to the selected item, wherein the interactive element further enables the user to purchase the determined one or more items.

In other embodiments, a method includes receiving, by a computing system, a request for a transaction; associating, by the computing system, the request with a user; receiving, by the computing system from the user, identification information; retrieving, by the computing system from a database, first stored authentication information associated with the user; retrieving, by the computing system from a distributed ledger, second stored authentication information associated with the user; and determining, by the computing system, that the received authentication information matches the first stored authentication details and the second stored authentication details and, in response, outputting, by the computing system, a proof of authentication to enable the transaction.

In some of these embodiments, outputting the proof of authentication comprises causing a user client device to display a one-time use code. In some of these embodiments, the user client device is the computing system. In some of these embodiments, the one-time use code is a QR code.

In some of these embodiments, the request for a transaction is received from a third party. In other of these embodiments, the method further includes retrieving, by the computing system, a private key; and decrypting the received identification information with the private key.

In some of these embodiments, the received identification information comprises a trusted answer to a verification question. In other of these embodiments, the request for a transaction is received in response to a user client device being within a threshold distance from a third party computing system. In some of these embodiments, the method further includes receiving, by the computing system from the user, a request to use a vehicle charging station; and determining, by the computing system, based on a location of the user and one or more user criteria, one or more available charging stations, wherein the third party computing system comprises one of the one or more available charging stations. In some of these embodiments, the method further includes presenting, by the computing system, to the user, information regarding the one or more charging stations; and receiving, by the computing system, from the user, a selection of the one of the one or more charging stations. In some of these embodiments, the information regarding the one or more charging stations comprises at least one of: a location of each charging station; a time of travel to each charging station; a location type; or a price per unit of each charging station.

In other embodiments, a system includes a processor; and a non-transitory computer-readable medium having stored thereon instructions that are executable by the processor to cause the system to perform operations including receiving, from a user client device, a request for access to a third party computing system; retrieving, from a distributed ledger, first authentication information associated with the user client device; receiving, from the user client device, second authentication information; and determining that the first authentication information and the second authentication information both match the user client device and, in response, causing the third party computing system to provide access to the user client device.

In some of these embodiments, causing the third party computing system to provide access to the user client device comprises transmitting a proof of authentication to the user client device. In some of these embodiments, the proof of authentication is a one-time code.

In other of these embodiments, the non-transitory computer-readable medium stores further instructions that, when executed by the processor, cause the system to perform further operations including receiving, from the user client device, third authentication information; wherein the second authentication information and the third authentication information comprise confirmations of login to two trusted systems; and wherein causing the third party computing system to provide access to the user client device is further in response to determining that the third authentication information matches the user client device.

In some of these embodiments, the non-transitory computer-readable medium stores further instructions that, when executed by the processor, cause the system to perform further operations including receiving, from the third party computing system, a request for a transaction between the third party computing system and the user client device; and automatically executing the requested transaction in response to the request from the third party computing system.

In other embodiments, a non-transitory computer readable medium storing instructions causes a computer system to perform the operations including receiving, from a user, a request for a transaction with a third party system; receiving, from the user, first authentication information comprising a login to a first trusted system; receiving, from the first trusted system, confirmation of a first valid login; receiving, from the user, second authentication information comprising a login to a second trusted system; receiving, from the second trusted system, confirmation of a second valid login; in response to the confirmation of the first valid login and the confirmation of the second valid login, providing, to the third party system, a proof of authentication.

In some of these embodiments, the non-transitory computer-readable medium stores further instructions that cause the system to perform further operations including retrieving third authentication information from a distributed ledger; decrypting the third authentication information using a private key stored in association with the non-transitory computer-readable medium; and determining that the decrypted third authentication information matches the confirmation of the first valid login and the confirmation of the second valid login, wherein providing, to the third party system, the proof of authentication is further in response to determining that the decrypted third authentication information matches the confirmation of the first valid login and the confirmation of the second valid login.

In some of these embodiments, the first authentication information or the second authentication information is received before the request for the transaction. In other of these embodiments, the non-transitory computer-readable medium stores further instructions that cause the system to perform further operations including automatically initiating the requested transaction in response to the confirmation of the first valid login and the confirmation of the second valid login.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method comprising:
receiving, by a computing system, a request for a transaction involving a user and a third party, wherein the request for a transaction is received in response to a user client device being within a threshold distance from a third party computing system;
associating, by the computing system, the request with the user;
receiving, by the computing system from the user, identification information of the user;
retrieving, by the computing system from a database, first stored authentication information associated with the user;
retrieving, by the computing system from a distributed ledger, second stored authentication information associated with the user; and
determining, by the computing system, without transmitting the identification information to the third party, that the received authentication information matches the first stored authentication details and the second stored authentication details and, in response, outputting, by the computing system, a proof of authentication to enable the transaction.

2. The method of claim 1, wherein outputting the proof of authentication comprises causing a user client device to display a one-time use code.

3. The method of claim 2, wherein the user client device is the computing system.

4. The method of claim 2, wherein the one-time use code is a QR code.

5. The method of claim 1, wherein the request for a transaction is received from the third party.

6. The method of claim 1, further comprising:
retrieving, by the computing system, a private key; and
decrypting the received identification information with the private key.

7. The method of claim 1, wherein the received identification information comprises a trusted answer to a verification question.

8. The method of claim 1, further comprising:
receiving, by the computing system from the user, a request to use a vehicle charging station; and
determining, by the computing system, based on a location of the user and one or more user criteria, one or more available charging stations,
wherein the third party computing system comprises one of the one or more available charging stations.

9. The method of claim 8, further comprising:
presenting, by the computing system, to the user, information regarding the one or more charging stations; and
receiving, by the computing system, from the user, a selection of the one of the one or more charging stations.

10. The method of claim 9, wherein the information regarding the one or more charging stations comprises at least one of:
a location of each charging station;
a time of travel to each charging station;
a location type; or
a price per unit of each charging station.

11. A system comprising:
a processor; and
a non-transitory computer-readable medium having stored thereon instructions that are executable by the processor to cause the system to perform operations comprising:
receiving, from a user client device, a request for access to a third party computing system, wherein the request is received in response to the user client device being within a threshold distance from the third party computing system;
retrieving, from a distributed ledger, first authentication information associated with the user client device;
receiving, from the user client device, second authentication information; and
determining, without providing the second authentication information to the third party, that the first authentication information and the second authentication information both match the user client device and, in response, causing the third party computing system to provide access to the user client device.

12. The system of claim 11, wherein causing the third party computing system to provide access to the user client device comprises transmitting a proof of authentication to the user client device.

13. The system of claim 12, wherein the proof of authentication is a one-time code.

14. The system of claim 11, wherein the non-transitory computer-readable medium stores further instructions that, when executed by the processor, cause the system to perform further operations comprising:
receiving, from the user client device, third authentication information;
wherein the second authentication information and the third authentication information comprise confirmations of login to two trusted systems; and
wherein causing the third party computing system to provide access to the user client device is further in response to determining that the third authentication information matches the user client device.

15. The system of claim 11, wherein the non-transitory computer-readable medium stores further instructions that, when executed by the processor, cause the system to perform further operations comprising:
receiving, from the third party computing system, a request for a transaction between the third party computing system and the user client device; and
automatically executing the requested transaction in response to the request from the third party computing system.

16. A non-transitory computer readable medium storing instructions for causing a computer system to perform the operations comprising:
receiving, from a user, a request for a transaction with a third party system, wherein the request for a transaction is received in response to a user client device being within a threshold distance from the third party computing system;
receiving, from the user, first authentication information comprising a login to a first trusted system;
receiving, from the first trusted system, confirmation of a first valid login;
receiving, from the user, second authentication information comprising a login to a second trusted system;
receiving, from the second trusted system, confirmation of a second valid login; and in response to the confirmation of the first valid login and the confirmation of the second valid login, providing, to the third party system, a proof of authentication.

17. The non-transitory computer readable medium of claim 16, wherein the non-transitory computer-readable medium stores further instructions that cause the system to perform further operations comprising:
retrieving third authentication information from a distributed ledger;
decrypting the third authentication information using a private key stored in association with the non-transitory computer-readable medium; and
determining that the decrypted third authentication information matches the confirmation of the first valid login and the confirmation of the second valid login,
wherein providing, to the third party system, the proof of authentication is further in response to determining that the decrypted third authentication information matches the confirmation of the first valid login and the confirmation of the second valid login.

18. The non-transitory computer readable medium of claim 16, wherein the first authentication information or the second authentication information is received before the request for the transaction.

19. The non-transitory computer readable medium of claim 16, wherein the non-transitory computer-readable medium stores further instructions that cause the system to perform further operations comprising:
automatically initiating the requested transaction in response to the confirmation of the first valid login and the confirmation of the second valid login.

* * * * *